(12) United States Patent
Ertas et al.

(10) Patent No.: US 12,421,904 B2
(45) Date of Patent: *Sep. 23, 2025

(54) MOUNTING ASSEMBLY FOR A GEARBOX ASSEMBLY

(71) Applicants: General Electric Company, Evendale, OH (US); GE Avio S.r.l., Rivalta di Torino (IT)

(72) Inventors: Bugra H. Ertas, Niskayuna, NY (US); Ravindra Shankar Ganiger, Bengaluru (IN); Andrea Piazza, Turin (IT); Arthur W. Sibbach, Boxford, MA (US)

(73) Assignees: GENERAL ELECTRIC COMPANY, Evendale, OH (US); GE AVIO S.R.L., Rivalta di Torino (IT)

( * ) Notice: Subject to any disclaimer, the term of this patent is extended or adjusted under 35 U.S.C. 154(b) by 0 days.

This patent is subject to a terminal disclaimer.

(21) Appl. No.: 19/184,773

(22) Filed: Apr. 21, 2025

(65) Prior Publication Data

US 2025/0243814 A1    Jul. 31, 2025

Related U.S. Application Data

(63) Continuation of application No. 18/910,905, filed on Oct. 9, 2024, now Pat. No. 12,281,618, which is a (Continued)

(30) Foreign Application Priority Data

Apr. 25, 2022  (IN) .............................. 202211024200

(51) Int. Cl.
*F02C 7/36*        (2006.01)
*F01D 15/10*        (2006.01)
(Continued)

(52) U.S. Cl.
CPC ................ *F02C 7/36* (2013.01); *F01D 15/10* (2013.01); *F16H 57/025* (2013.01);
(Continued)

(58) Field of Classification Search
CPC .......... F16H 57/025; F16H 57/08; F02C 7/36; F05D 2240/62; H02M 1/0067; H02M 7/003; H02M 1/327
See application file for complete search history.

(56) References Cited

U.S. PATENT DOCUMENTS 5,433,674 A    7/1995  Sheridan et al.
8,297,916 B1   10/2012 McCune et al.
(Continued)

FOREIGN PATENT DOCUMENTS

CA    2610636 A1    5/2008
CN    108302162 A   7/2018
(Continued)

*Primary Examiner* — Topaz L. Elliott
(74) *Attorney, Agent, or Firm* — Venable LLP; Peter T. Hrubiec; Michele V. Frank

(57) ABSTRACT

A mounting assembly for a gearbox assembly of a gas turbine engine includes at least one mounting member configured to mount a gear of the gearbox assembly to a component of the gas turbine engine, the at least one mounting member characterized by a lateral impedance parameter, a bending impedance parameter, and a torsional impedance parameter. A gas turbine engine includes the mounting assembly. The at least one mounting member may be a flex mount, a fan frame, or a flex coupling. The gas turbine engine includes an electric power system including at least one electric machine. The electric power system includes a plurality of power converters and a plurality of power distribution management units. At least two of the
(Continued)

plurality of power converters or the plurality of power distribution management units are integrated together in a single housing.

20 Claims, 22 Drawing Sheets

Related U.S. Application Data continuation-in-part of application No. 17/929,105, filed on Sep. 1, 2022, now Pat. No. 12,203,418.

(51) Int. Cl.
*F16H 57/02* (2012.01)
*F16H 57/025* (2012.01)
*H02M 1/00* (2007.01)
*H02M 1/32* (2007.01)
*H02M 7/00* (2006.01)

(52) U.S. Cl.
CPC .. *F05D 2220/76* (2013.01); *F05D 2260/4031* (2013.01); *F16H 2057/02026* (2013.01); *F16H 2057/02034* (2013.01); *F16H 2057/02039* (2013.01); *H02M 1/0067* (2021.05); *H02M 1/327* (2021.05); *H02M 7/003* (2013.01)

(56) References Cited

U.S. PATENT DOCUMENTS

| | | |
|---|---|---|
| 8,297,917 B1 | 10/2012 | McCune et al. |
| 8,747,055 B2 | 6/2014 | McCune et al. |
| 8,770,922 B2 | 7/2014 | McCune et al. |
| 8,814,503 B2 | 8/2014 | McCune et al. |
| 8,899,915 B2 | 12/2014 | McCune et al. |
| 9,631,558 B2 | 4/2017 | McCune et al. |
| 10,301,968 B2 | 5/2019 | McCune et al. |
| 10,392,119 B2 | 8/2019 | Niergarth et al. |
| 11,021,997 B2 | 6/2021 | McCune et al. |
| 11,300,001 B2 | 4/2022 | Lavoie et al. |
| 11,325,714 B2 | 5/2022 | Datta et al. |
| 11,532,937 B2 | 12/2022 | Brookes et al. |
| 11,585,232 B2 | 2/2023 | Lavoie et al. |
| 11,646,579 B2 | 5/2023 | Husband et al. |
| 11,845,388 B2 | 12/2023 | Huh et al. |
| 11,970,062 B2 | 4/2024 | Dalal |
| 2007/0225111 A1 | 9/2007 | Duong et al. |
| 2010/0060076 A1 | 3/2010 | Gemin et al. |
| 2010/0105516 A1 | 4/2010 | Sheridan et al. |
| 2011/0108663 A1 | 5/2011 | Westenberger |
| 2013/0067931 A1 | 3/2013 | Hindle et al. |
| 2013/0287575 A1 | 10/2013 | McCune et al. |
| 2015/0308351 A1 | 10/2015 | Sheridan |
| 2017/0122426 A1 | 5/2017 | Miller et al. |
| 2018/0291807 A1 | 10/2018 | Dalal |
| 2019/0120363 A1 | 4/2019 | Grubba |
| 2019/0257211 A1 | 8/2019 | Huang et al. |
| 2020/0003128 A1 | 1/2020 | Maguire et al. |
| 2020/0088106 A1 | 3/2020 | Miller et al. |
| 2020/0157966 A1 | 5/2020 | Huang et al. |
| 2021/0071583 A1 | 3/2021 | Bruce et al. |
| 2021/0172381 A1 | 6/2021 | Spruce |
| 2022/0009643 A1 | 1/2022 | Datta et al. |
| 2022/0025820 A1 | 1/2022 | Dalal |
| 2023/0138442 A1 | 5/2023 | Muldoon |
| 2023/0212987 A1 | 7/2023 | Payyoor et al. |
| 2023/0235715 A1 | 7/2023 | McCune et al. |

FOREIGN PATENT DOCUMENTS

| | | |
|---|---|---|
| CN | 108781520 A | 11/2018 |
| EP | 3832096 A1 | 6/2021 |
| FR | 3127024 A1 | 3/2023 |
| FR | 3127025 A1 | 3/2023 |
| FR | 3129375 A1 | 5/2023 |
| FR | 3129436 A1 | 5/2023 |
| FR | 3129690 A1 | 6/2023 |
| FR | 3129970 A1 | 6/2023 |
| FR | 3130313 A1 | 6/2023 |
| FR | 3130323 A1 | 6/2023 |
| FR | 3130747 A1 | 6/2023 |
| FR | 3130875 A1 | 6/2023 |
| FR | 3132279 A1 | 8/2023 |
| FR | 3132729 A1 | 8/2023 |
| JP | 2004316474 A | 11/2004 |
| JP | 4192661 B2 | 12/2008 |
| WO | 2023037074 A1 | 3/2023 |
| WO | 2023037075 A1 | 3/2023 |

MOUNTING ASSEMBLY FOR A GEARBOX ASSEMBLY

CROSS REFERENCE TO RELATED APPLICATIONS

This application is a continuation of U.S. patent application Ser. No. 18/910,905 filed on Oct. 9, 2024, which is a continuation-in-part of U.S. patent application Ser. No. 17/929,105 filed on Sep. 1, 2022, which issued as U.S. Pat. No. 12,203,418 on Jan. 21, 2025, which claims the benefit of Indian Patent Application No. 202211024200, filed on Apr. 25, 2022, the entire contents of which are incorporated by reference in their entireties.

TECHNICAL FIELD

The present disclosure relates to a mounting assembly for a gearbox assembly of a gas turbine engine. In particular, the present disclosure relates to at least one impedance parameter for a gearbox assembly mounting assembly for a gas turbine engine.

BACKGROUND

A gas turbine engine includes a fan driven by a turbine. A gearbox assembly is coupled between the fan and the turbine. The gearbox assembly provides a speed decrease between the turbine and the fan. The gearbox assembly is mounted to a static structure of the engine via one or more mounting members.

BRIEF DESCRIPTION OF THE DRAWINGS

Features and advantages of the present disclosure will be apparent from the following description of various exemplary embodiments, as illustrated in the accompanying drawings, wherein like reference numbers generally indicate identical, functionally similar, or structurally similar elements.

DETAILED DESCRIPTION

Features, advantages, and embodiments of the present disclosure are set forth or apparent from a consideration of the following detailed description, drawings, and claims. Moreover, the following detailed description is exemplary and intended to provide further explanation without limiting the scope of the disclosure as claimed.

Various embodiments are discussed in detail below. While specific embodiments are discussed, this is done for illustration purposes only. A person skilled in the relevant art will recognize that other components and configurations may be used without departing from of the present disclosure.

As used herein, the terms "first," "second," and "third" may be used interchangeably to distinguish one component from another and are not intended to signify location or importance of the individual components.

The terms "forward" and "aft" refer to relative positions within a gas turbine engine or vehicle, and refer to the normal operational attitude of the gas turbine engine or vehicle. More particularly, forward and aft are used herein with reference to a direction of travel of the vehicle and a direction of propulsive thrust of the gas turbine engine.

The terms "upstream" and "downstream" refer to the relative direction with respect to fluid flow in a fluid pathway. For example, "upstream" refers to the direction from which the fluid flows, and "downstream" refers to the direction to which the fluid flows.

The terms "coupled," "fixed," "attached," "connected," and the like, refer to both direct coupling, fixing, attaching, or connecting as well as indirect coupling, fixing, attaching, or connecting through one or more intermediate components or features, unless otherwise specified herein.

The singular forms "a," "an," and "the" include plural references unless the context clearly dictates otherwise.

Figure 7:
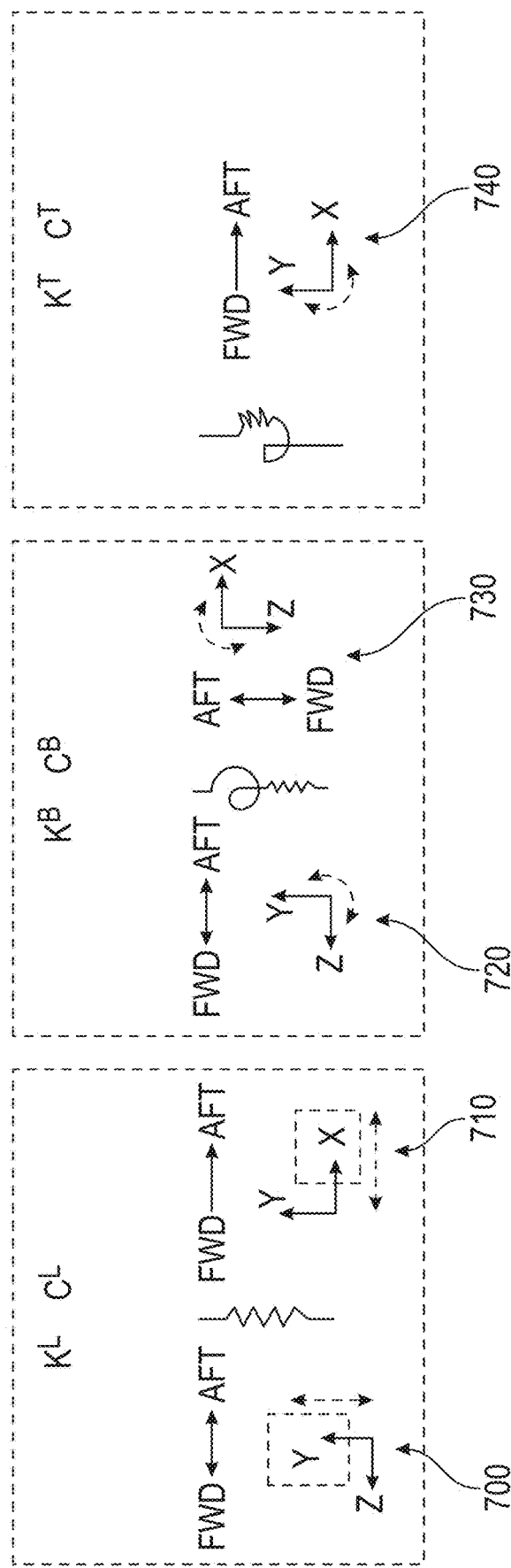
FIG. 7A shows a schematic of the degrees of freedom of lateral stiffness, according to an embodiment of the present disclosure.
FIG. 7B shows a schematic of the degrees of freedom of bending stiffness, according to an embodiment of the present disclosure.
FIG. 7C shows a schematic of the degrees of freedom of torsional stiffness, according to an embodiment of the present disclosure.

The terms "lateral stiffness" and "lateral structural stiffness" are used interchangeably and refer to the stiffness of a component having degrees of freedom in the lateral and the radial directions. That is, the stiffness of a component in the radial direction (direction Y in FIGS. 1 and 7A) and the lateral direction (direction X in FIG. 7A; into and out of the page in FIG. 1). The lateral stiffness is defined as shown in FIG. 7A. The lateral stiffness is identified herein as $K^L$.

The terms "bending stiffness" and "bending structural stiffness" are used interchangeably and refer to the stiffness of a component having degrees of freedom in the pitch and the yaw directions. That is, the stiffness of a component in the pitch direction (about the Y and Z plane in FIG. 7B) and the yaw direction (about the Z and X plane in FIG. 7B). The bending stiffness is defined as shown in FIG. 7B. The bending stiffness is identified herein as $K^B$.

The term "casing" herein refers to the structure that defines an airflow path (e.g., wall of duct, or casing). A mounting to the casing may be a direct bolted connection or through a load bearing frame.

A "static structure" as herein referred means any structural part of an engine that is non-rotating.

The terms "torsional stiffness" and "torsional structural stiffness" are used interchangeably and refer to the stiffness of a component having degrees of freedom in the torsional or rotational direction about an engine centerline (about the X and Y plane in FIG. 7C, about the engine centerline). The torsional stiffness is defined as shown in FIG. 7C. The torsional stiffness herein is identified as $K^T$.

The term "lateral damping" refers to the structural damping of a component in the lateral direction at a frequency of vibration. The lateral damping is identified herein as $C^L$.

The term "bending damping" refers to the structural damping of a component in the bending direction at a frequency of vibration. The bending damping is identified herein as $C^B$.

The term "torsional damping" refers to the structural damping of a component in the torsional or rotational direction at a frequency of vibration. The torsional damping is identified herein as $C^T$.

Here and throughout the specification and claims, range limitations are combined and interchanged. Such ranges are identified and include all the sub-ranges contained therein unless context or language indicates otherwise. For example, all ranges disclosed herein are inclusive of the endpoints, and the endpoints are independently combinable with each other.

The loading of a gas turbine engine, while the engine is producing thrust, induces thrust reaction forces through the aircraft-engine mounting points. For example, the mount points to a wing pylon induce during a take-off or a climb sequence a net bending moment about the pitch axis. The resulting deflections cause relative movement among, e.g., turbine shaft(s), mid-frame, engine casing, front frame, etc. These relative movements, occurring sometimes at different rates (depending on flight conditions) result in coupled loads among the supporting structure, engine frames, shafts, casing etc. This results in relative movements, bending, or shifting at different rates and to different degrees (depending on load paths, flexible/stiff joints, parts etc.). The bending of the engine also deforms the casing of the engine along its length. The degree to which components move relative to each other depends on how they are connecting to each other, the material used and the structural dynamic properties of the interconnected structure supporting the components. If these aspects of engine design are not fully taken into consideration, there may result misalignments resulting in pre-mature failure or wear of component parts, e.g., bearings, seals, etc.

One such component affected by the dynamic loading of the engine is a power gearbox, utilized to transfer power from a turbine shaft to a main fan. Such gearboxes may include a sun gear, a plurality of planet gears, and a ring gear. The sun gear meshes with the plurality of planet gears and the plurality of planet gears mesh with the ring gear. In operation, the gearbox transfers the torque transmitted from a turbine shaft operating at a first speed to a fan shaft rotating at a second, lower speed. For a planet configuration of the gearbox, the sun gear may be coupled to the mid-shaft of a lower pressure turbine rotating at the first speed. The planet gears, intermeshed with the sun gear, then transfer this torque to the fan shaft through a planet carrier. In a star configuration, a ring gear is coupled to the fan shaft. In either configuration, the gearbox is supported by, for example, a flex mount, a flex coupling, and a fan frame coupling.

The relative movements of the frames supporting the gearbox and input/output shafts for the gearbox, as a result of the aforementioned loading on the engine, can cause not insignificant relative movements among the moving parts of the power gearbox, i.e., the gears, carrier, ring etc. resulting in misalignments in the geartrain. This misalignment then causes distortions or eccentric loading, in particular, the torque loads are not uniformly resolved, or uniformly distributed among the gears. This results in edge loading and high stresses within the individual gears and the gearbox assembly, which may result in degradation of gear life, failure, or breakage of the gears.

As engines increase in thrust and power, the loading environments described become more challenging to accommodate while assuring sufficient life and durability of a gearbox assembly. The inventors, having a need to improve upon the existing support structure for power gearboxes to support mission requirements, designed several different configurations of gearbox supports to arrive at an improved design, better suited to handle the loads environment for particular flight conditions in different architectures, thereby extending life of parts in a gearbox and avoiding premature failure events.

Figure 1:
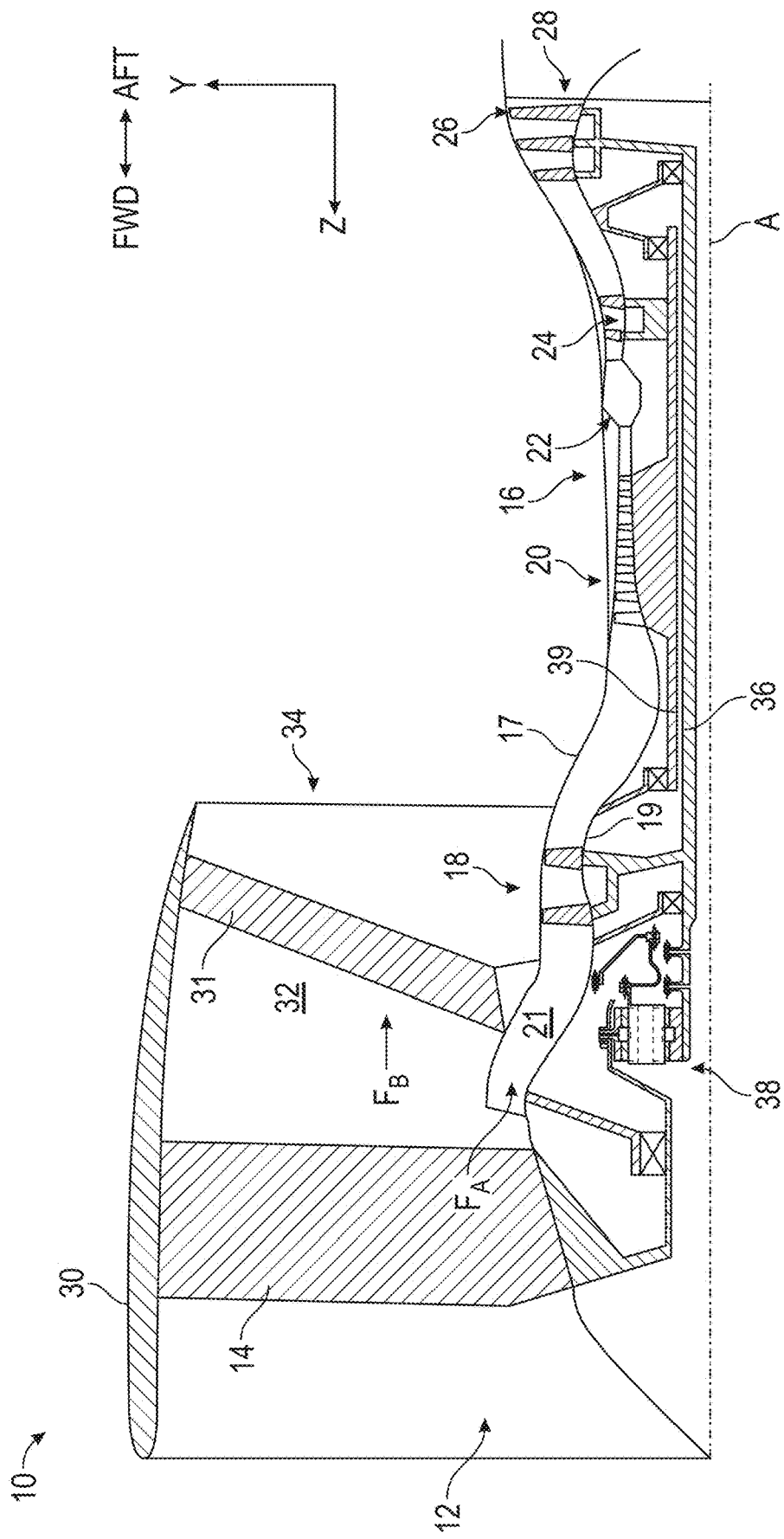
FIG. 1 shows a schematic, cross-sectional view of a gas turbine engine, taken along a centerline of the gas turbine engine, according to an embodiment of the present disclosure.

FIG. 1 shows a schematic cross-sectional view of a gas turbine engine 10 taken along a center axis, also referred to as a longitudinal centerline axis A, that is a principal rotational axis. The gas turbine engine 10 includes an air intake 12 and a fan 14 that generates two airflows: a core airflow $F_A$ and a bypass airflow $F_B$. The gas turbine engine 10 includes an engine core 16, also referred to as a turbo-engine, that receives the core airflow $F_A$. The gas turbine engine 10 includes a casing 17 that encircles the engine core 16. The engine core 16 includes, in axial flow series, a low-pressure compressor 18, a high-pressure compressor 20, a combustion section 22, a high-pressure turbine 24, a low-pressure turbine 26, and a core exhaust nozzle 28. The casing 17 generally defines a core flow passage 21 through which the core airflow $F_A$ flows. A nacelle 30, via an engine frame strut 31 (also referred to as a fan guide vane), surrounds the gas turbine engine 10 and may serve as an outlet guide vane. The nacelle 30 defines a bypass duct 32 and a bypass exhaust nozzle 34. The bypass airflow $F_B$ flows through the bypass duct 32. The fan 14 is coupled to and driven by the low-pressure turbine 26 via a low-pressure shaft 36 and a gearbox assembly 38.

In use, the core airflow $F_A$ is accelerated and compressed by the low-pressure compressor 18 and directed into the high-pressure compressor 20 where further compression takes place. The compressed air exhausted from the high-pressure compressor 20 is directed into the combustion section 22 where it is mixed with fuel and the mixture is combusted. The resultant hot combustion products then expand through, and thereby drive, the high-pressure turbine 24 and the low-pressure turbine 26 before being exhausted through the core exhaust nozzle 28. This provides propulsive thrust. The high-pressure turbine 24 drives the high-pressure compressor 20 by a high-pressure shaft 39. The fan 14 generally provides the majority of the propulsive thrust. The gearbox assembly 38 is a reduction gearbox, power gearbox that delivers a torque from the LP shaft 36 running at a first speed, to a fan shaft coupled to fan 14 running at a second, slower speed.

Figure 2:
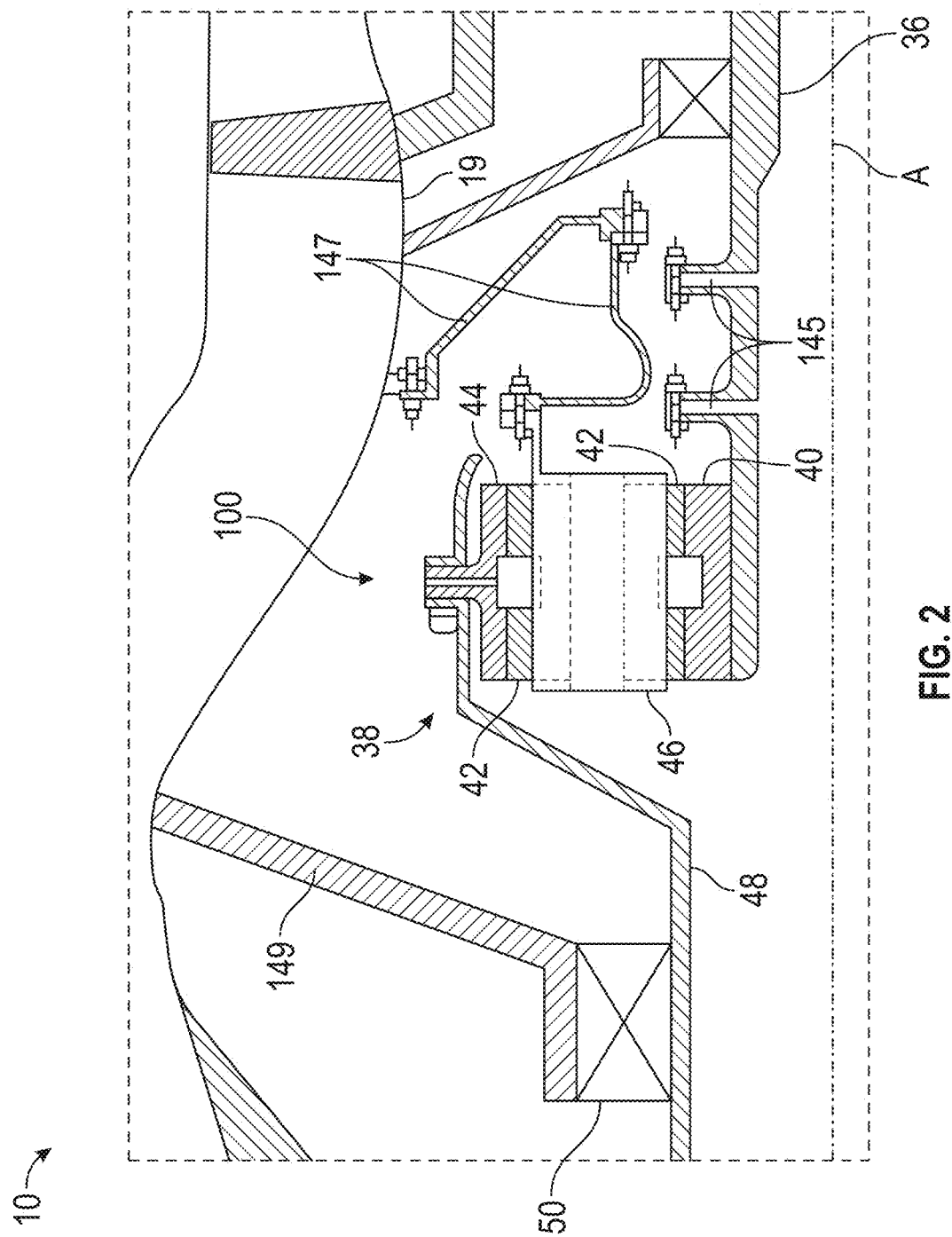
FIG. 2 shows an enlarged, schematic, cross-sectional view of a gearbox assembly of a gas turbine engine, taken along a centerline of the gas turbine engine, according to an embodiment of the present disclosure.
Figure 3:
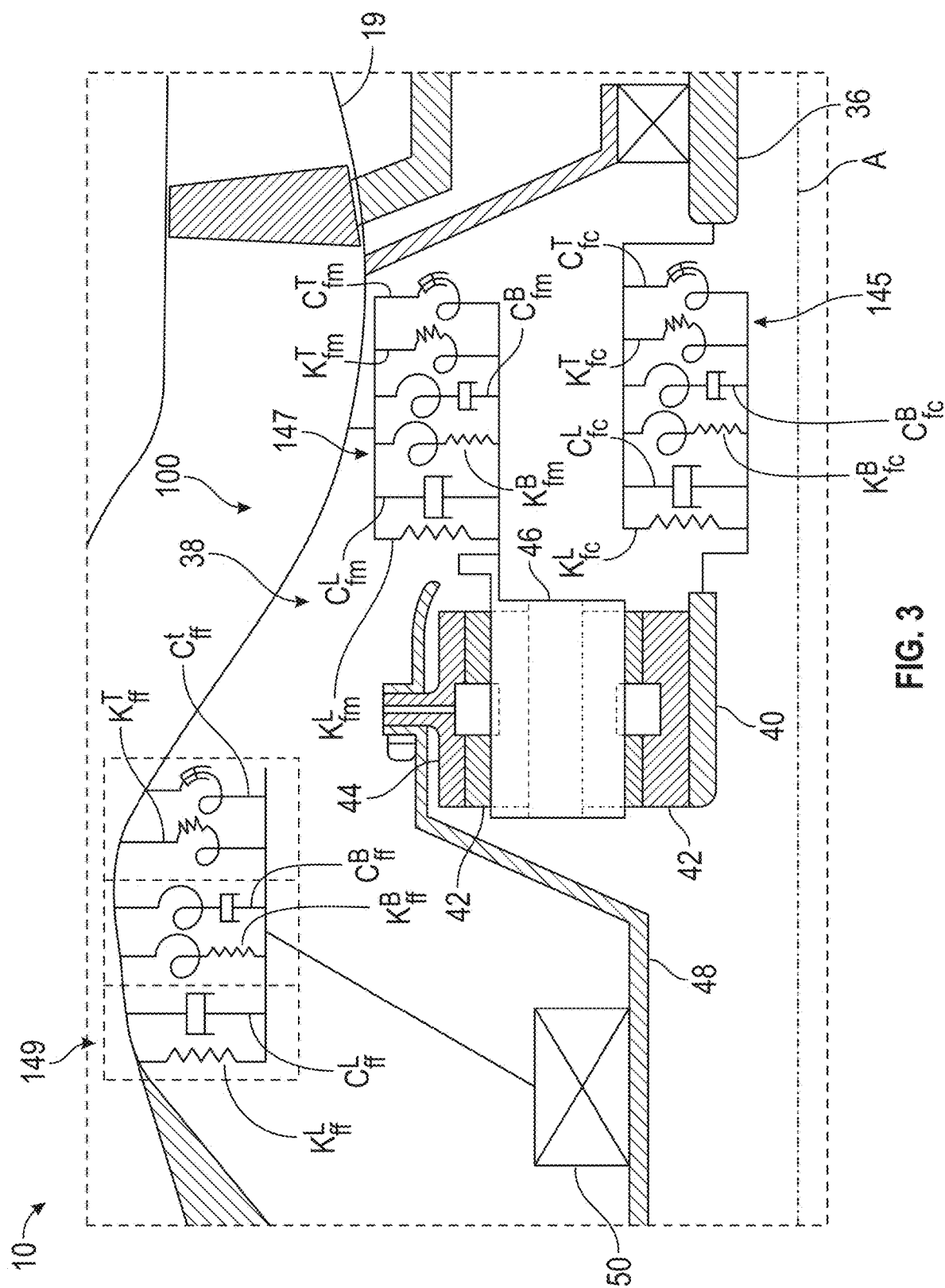
FIG. 3 shows a schematic, cross-sectional view of the gearbox assembly of FIG. 2, translated into a representative vibratory system.

FIGS. 2 and 3 illustrate enlarged, schematic side cross-sectional views of the gearbox assembly 38 of FIG. 1 with a mounting assembly 100. The mounting assembly 100 shown is that for a star configuration gearbox, described in more detail to follow. The gearbox assembly 38 includes a sun gear 40, a plurality of planet gears 42, and a ring gear 44. The low-pressure turbine 26 (FIG. 1) drives the low-pressure shaft 36, which is coupled to the sun gear 40 of the gearbox assembly 38. The sun gear 40 of the gearbox assembly 38 is coupled via a flex coupling 145 to the rotating low-pressure shaft 36.

Radially outwardly of the sun gear 40, and intermeshing therewith, is the plurality of planet gears 42 that are coupled together by a planet carrier 46. The planet carrier 46 of the gearbox assembly 38 is coupled, via a flex mount 147, to the engine static structure 19. The planet carrier 46 constrains the plurality of planet gears 42 while allowing each planet gear of the plurality of planet gears 42 to rotate about its own axis. Radially outwardly of the plurality of planet gears 42, and intermeshing therewith, is the ring gear 44, which is an annular ring gear 44. The ring gear 44 is coupled via a fan shaft 48 to the fan 14 (FIG. 1) in order to drive rotation of the fan 14 about the axis A. The fan shaft 48 is coupled to a fan frame 149 via a fan bearing 50. The fan frame 149 couples the rotating ring gear 44 of the gearbox assembly 38 and, thus, the rotating fan shaft 48, to the engine static structure 19. The flex coupling 145, the flex mount 147, and the fan frame 149 define the mounting assembly 100 for the gearbox assembly 38. As described herein, the flex coupling 145, the flex mount 147, and the fan frame 149 may be referred to as mounting members.

Although not depicted in FIGS. 2 and 3 for clarity, each of the sun gear 40, the plurality of planet gears 42, and the ring gear 44 includes teeth about their periphery to intermesh with the other gears. In the example of FIGS. 2 and 3, the gearbox assembly 38 is a star configuration. That is, the ring gear 44 rotates, while the planet carrier 46 is fixed and stationary. The planet carrier 46 constrains the plurality of planet gears 42 such that the plurality of planet gears 42 do not together rotate around the sun gear 40, while also enabling each planet gear of the plurality of planet gears 42 to rotate about its own axis. That is, since the plurality of planet gears 42 mesh with both the rotating ring gear 44 as well as the rotating sun gear 40, each of the plurality of planet gears 42 rotate about their own axes to drive the ring gear 44 to rotate about engine axis A (FIG. 1) due to the rotation of the sun gear 40. The rotation of the ring gear is 44 conveyed to the fan 14 (FIG. 1) through the fan shaft 48.

FIG. 3 illustrates the mounting assembly 100 of FIG. 2 translated into a representative vibratory system where each of the flex coupling 145, the flex mount 147, and the fan frame 149 are shown by representative structural properties of the members, the representative structural properties being the structural stiffness (K) and the damping (C) of the respective members of the mounting assembly 100. As shown, each of the flex coupling 145, the flex mount 147, and the fan frame 149 includes the representative structural properties (structural stiffness and damping) in each of the lateral direction, the bending direction, and the torsional direction.

For example, FIG. 3 represents the gearbox supporting structure in terms of structural properties characterizing the nature of the coupling between the gearbox and the flex coupling 145. The flex coupling 145 may be represented in terms of a flex coupling lateral stiffness $K_{fc}^L$, a flex coupling bending stiffness $K_{fc}^B$, a flex coupling torsional stiffness $K_{fc}^T$, a flex coupling lateral damping $C_{fc}^L$, a flex coupling bending damping $C_{fc}^B$, and a flex coupling torsional damping $C_{fc}^T$.

FIG. 3 represents the gearbox supporting structure in terms of structural properties characterizing the nature of the coupling between the gearbox and the flex mount 147. The flex mount 147 may be represented in terms of a flex mount lateral stiffness $K_{fm}^L$, a flex mount bending stiffness $K_{fm}^B$, a flex mount torsional stiffness $K_{fm}^T$, a flex mount lateral damping $C_{fm}^B$, a flex mount bending damping $C_{fm}^B$, and a flex mount torsional damping $C_{fm}^T$.

FIG. 3 represents the gearbox supporting structure in terms of structural properties characterizing the nature of the coupling between the gearbox and the fan frame 149. The fan frame 149 may be represented in terms of fan frame lateral stiffness $K_{ff}^L$, a fan frame bending stiffness $K_{ff}^B$, a fan frame torsional stiffness $K_{ff}^T$, a fan frame lateral damping $C_{ff}^L$, a fan frame bending damping $C_{ff}^B$, and a fan frame torsional damping $C_{ff}^T$.

Figure 4:
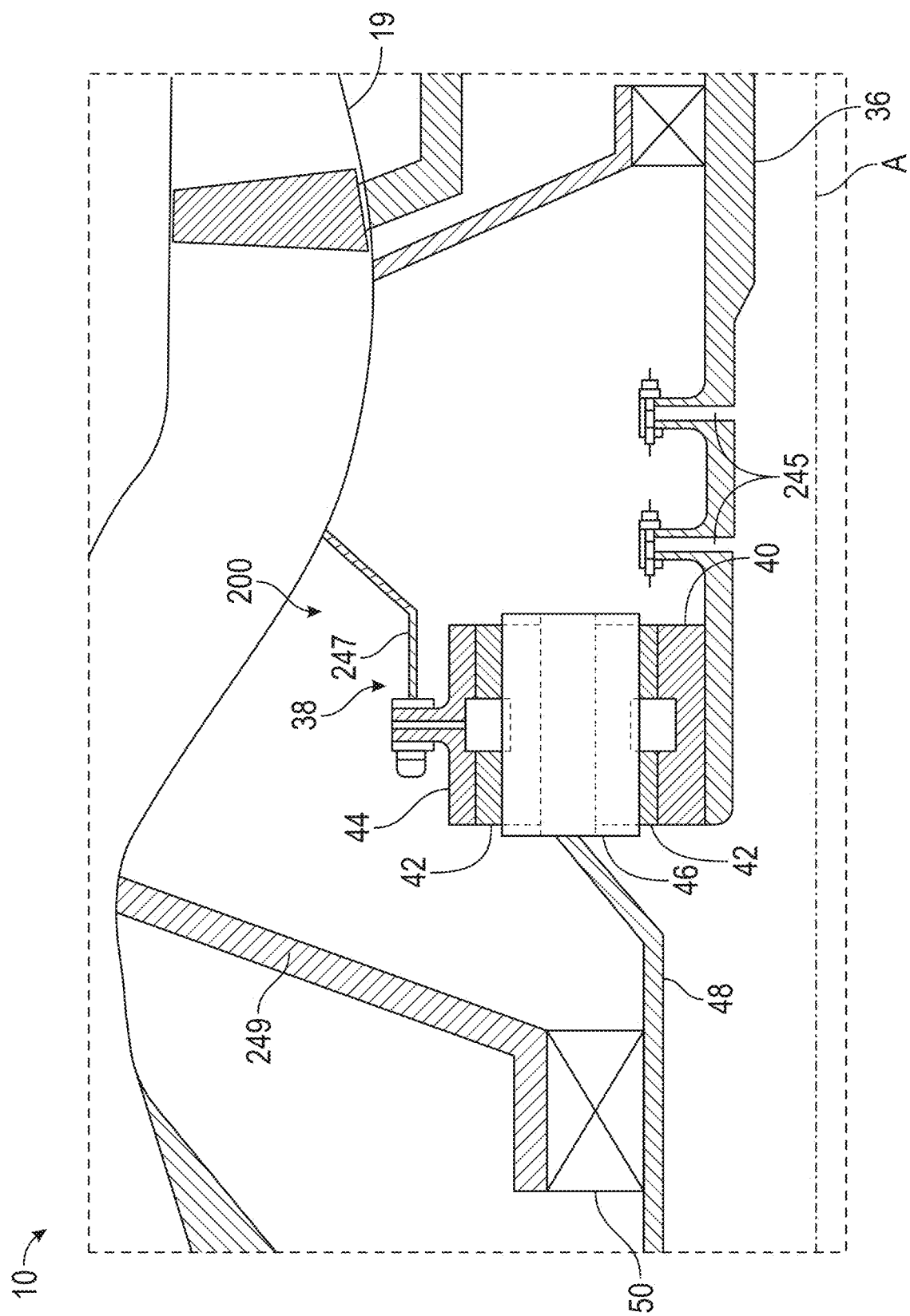
FIG. 4 shows an enlarged, schematic, cross-sectional view of a gearbox assembly of a gas turbine engine, taken along a centerline of the gas turbine engine, according to an embodiment of the present disclosure.
Figure 5:
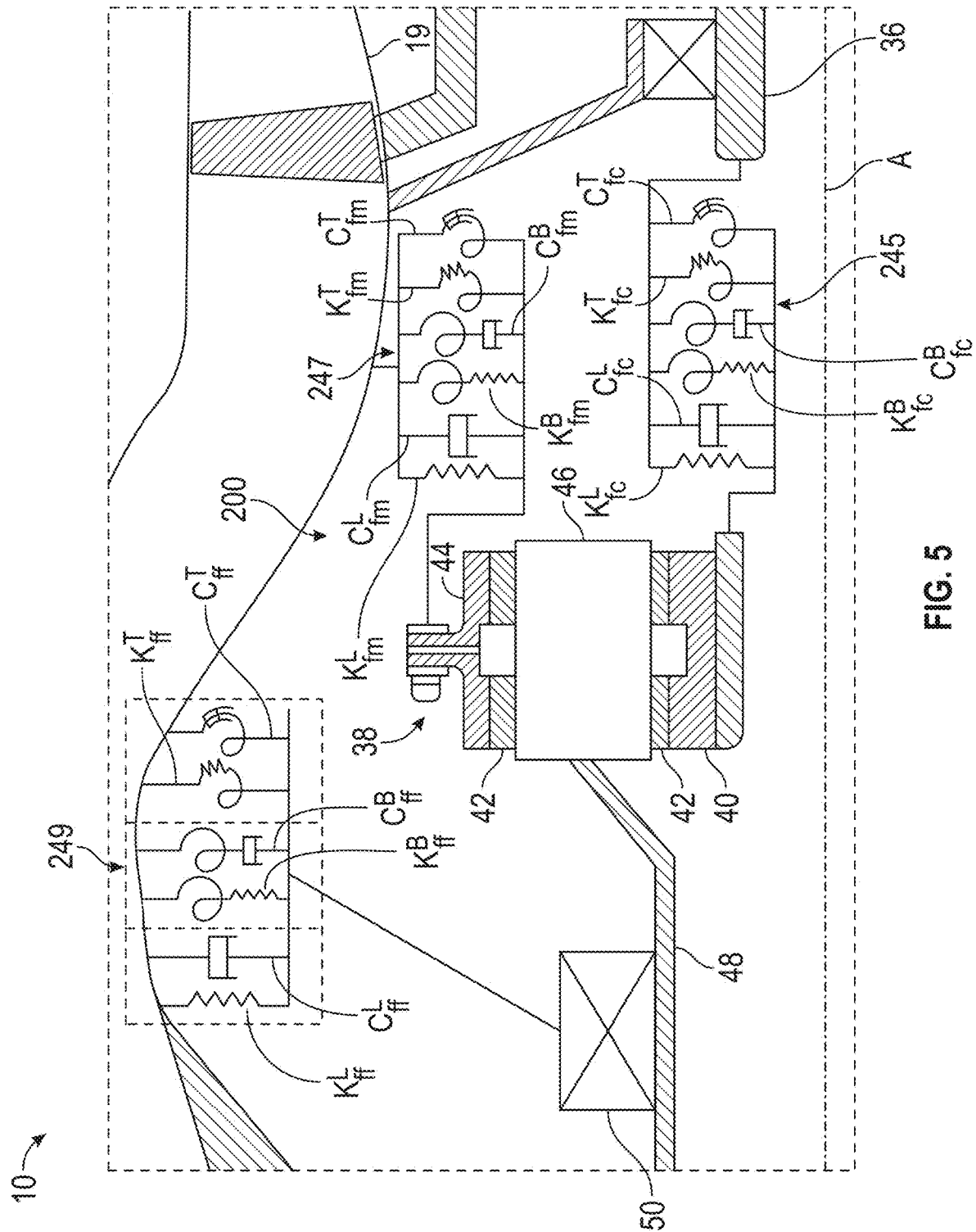
FIG. 5 shows a schematic, cross-sectional view of the gearbox assembly of FIG. 4, translated into a representative vibratory system.

FIGS. 4 and 5 illustrate enlarged, schematic side cross-sectional views of the gearbox assembly 38 of FIG. 1 with a mounting assembly 200. The mounting assembly 200 shown is that for a planetary configuration gearbox, described in more detail to follow. As mentioned, the gearbox assembly 38 includes the sun gear 40, the plurality of planet gears 42, and the ring gear 44. The low-pressure turbine 26 (FIG. 1) drives the low-pressure shaft 36, which is coupled to the sun gear 40 of the gearbox assembly 38. The sun gear 40 is coupled via a flex coupling 245 to the low-pressure shaft 36.

Radially outwardly of the sun gear 40, and intermeshing therewith, is the plurality of planet gears 42 that are coupled together by a planet carrier 46. The planet carrier 46 is coupled, via the fan shaft 48, to the fan 14 (FIG. 1) to drive rotation of the fan 14 about the axis A. The fan shaft 48 is coupled to a fan frame 249 via the fan bearing 50. The planet carrier 46 constrains the plurality of planet gears 42 to rotate together about the sun gear 40, while also allowing each planet gear of the plurality of planet gears 42 to rotate about its own axis. Thus, the plurality of planet gears 42, the planet carrier 46, and the sun gear 40 rotate about the engine axis A. Radially outwardly of the plurality of planet gears 42, and intermeshing therewith, is the ring gear 44, which is an annular ring gear 44. The ring gear 44 is coupled via a flex mount 247 to the engine static structure 19. The flex coupling 245, the flex mount 247, and the fan frame 249 define the mounting assembly 200 for the gearbox assembly 38. As described herein, the flex coupling 245, the flex mount 247, and the fan frame 249 may be referred to as mounting members.

Although not depicted in FIGS. 4 and 5 for clarity, each of the sun gear 40, the plurality of planet gears 42, and the ring gear 44 includes teeth about their periphery to intermesh with the other gears. In the example of FIGS. 4 and 5, the gearbox assembly 38 is a planetary configuration. That is, the ring gear 44 is static (being fixedly mounted via the flex mount 247 to the engine static structure 19), while the planet carrier 46 and the plurality of planet gears 42 therein, rotate about the engine centerline axis A. The planet carrier 46 constrains the plurality of planet gears 42 such that the plurality of planet gears 42 rotate together around the sun gear 40, while also enabling each planet gear of the plurality of planet gears 42 to rotate about its own axis. The rotation of the planet carrier 46 is conveyed to the fan 14 (FIG. 1) through the fan shaft 48.

FIG. 5 illustrates the mounting assembly 200 of FIG. 4 translated into a representative vibratory system where each of the flex coupling 245, the flex mount 247, and the fan frame 249 are shown by representative structural properties of the members, the representative structural properties being the structural stiffness (K) and the damping (C) of the respective members of the mounting assembly 200. As shown, each of the flex coupling 245, the flex mount 247, and the fan frame 249 includes the representative structural properties (structural stiffness and damping) in each of the lateral direction, the bending direction, and the torsional direction.

For example, FIG. 5 represents the gearbox supporting structure in terms of structural properties characterizing the nature of the coupling between the gearbox and the flex coupling 245. The flex coupling 245 may be represented in terms of a flex coupling lateral stiffness $K_{fc}^L$, a flex coupling bending stiffness $K_{fc}^B$, a flex coupling torsional stiffness $K_{fc}^T$, a flex coupling lateral damping $C_{fc}^L$, a flex coupling bending damping $C_{fc}^B$, and a flex coupling torsional damping $C_{fc}^T$.

FIG. 5 represents the gearbox supporting structure in terms of structural properties characterizing the nature of the coupling between the gearbox and the flex mount 247. The flex mount 247 may be represented in terms of a flex mount lateral stiffness K/m, a flex mount bending stiffness $K_{fm}^B$, a flex mount torsional stiffness $K_{fm}^T$, a flex mount lateral damping $C_{fm}^B$, a flex mount bending damping $C_{fm}^B$, and a flex mount torsional damping $C_{ff}^T$.

FIG. 5 represents the gearbox supporting structure in terms of structural properties characterizing the nature of the coupling between the gearbox and the fan frame 249. The fan frame 249 may be represented in terms of a fan frame lateral stiffness $K_{ff}^L$, a fan frame bending stiffness $K_{ff}^B$, a fan frame torsional stiffness $K_{ff}^T$, a fan frame lateral damping $C_{ff}^L$, a fan frame bending damping $C_{ff}^B$, and a fan frame torsional damping $C_{ff}^T$.

The gearbox mounting systems and configurations in FIGS. 2 and 4 can be translated into a representative vibratory system, as shown in FIGS. 3 and 5, respectively. Each interface to the gear box, whether a fan frame, flex mount, or flex coupling has geometric qualities that translate to lateral, bending, and torsional stiffness and damping elements. For example, the flex mount support system may have relatively thin-walled undulating supports engineered to possess specific values for stiffness and damping. Support wall thickness and support member span or extent play a critical role in determining stiffness and damping values. Thinner members certainly allow for lower values stiffness quantities and shorter spans or member lengths contribute to higher values stiffness properties. Similarly, the 2 flex mount flex elements on the input shaft use member thickness and outer diameter to control stiffness and damping. As member thickness decreases and diaphragm diameter increases, stiffness properties decrease in the mounting location. For the fan frame support, it is good practice to design this mounting element and location to be as stiff as possible while minimizing weight. The fan support frame needs a high degree of stiffness due to potential fan overloads that can occur; like in a blade out failure scenario. Therefore, the design approach for the flex mount and flex element lateral and bending stiffness values are desired to be notably softer than the fan support frame, which allows for the gearbox system to follow the fan frame support movement while generating low reaction forces and moments at the flex mount and flex coupling mounting locations. Conversely, the torsional stiffness of the flex mount and flex coupling mounting elements is desired to be design as stiff as possible since these elements are in the main torque transmission torque path with the fan.

Figure 6:
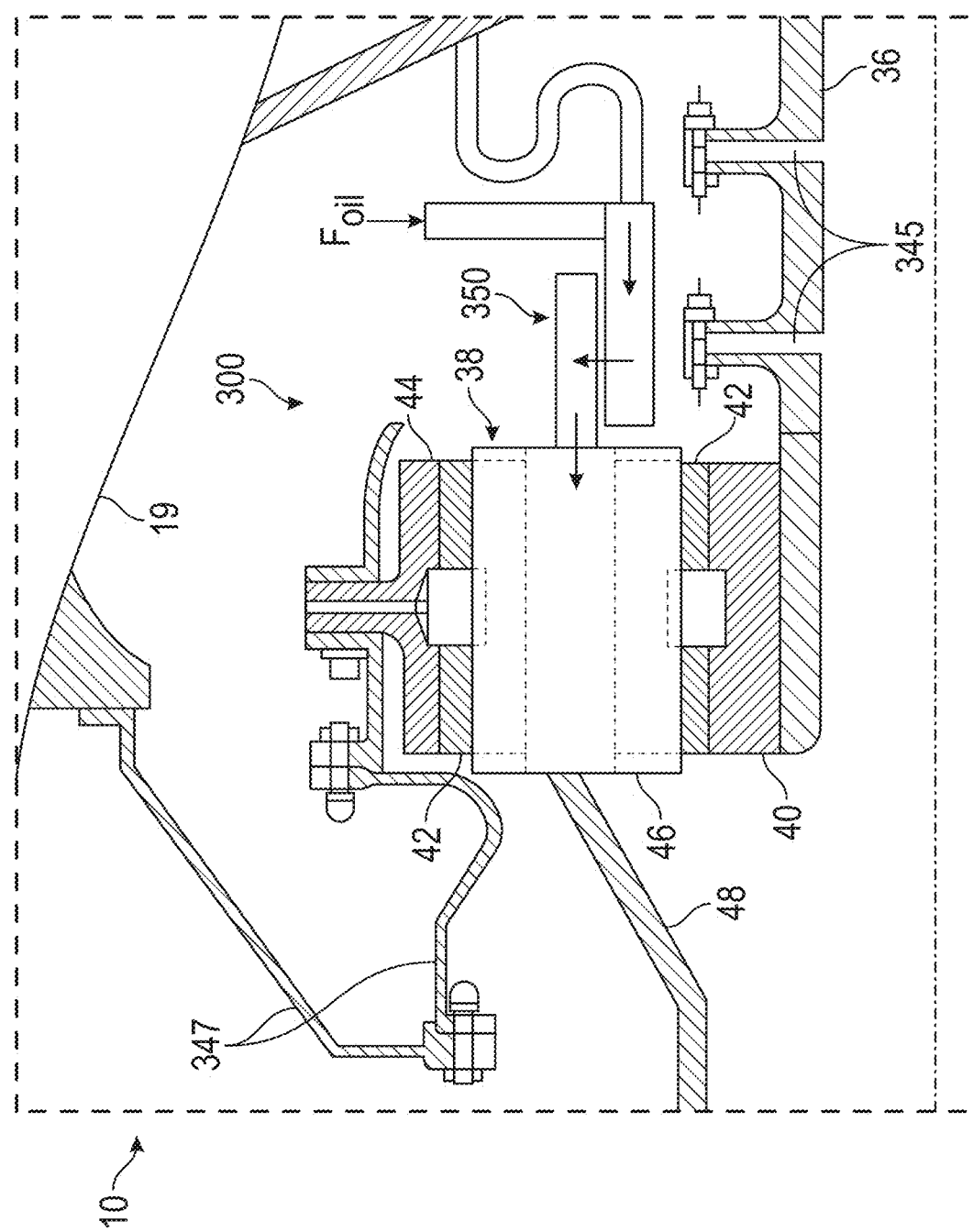
FIG. 6 shows a schematic, cross-sectional view of a gearbox assembly of a gas turbine engine with an oil transfer device, according to an embodiment of the present disclosure.

FIG. 6 illustrates an enlarged, schematic side view of the gearbox assembly 38 of FIG. 1 with a mounting assembly 300. The mounting assembly 300 is that for a planetary configuration, as described with respect to FIGS. 4 and 5. That is, the ring gear 44 is coupled with a flex mount 347 to the engine static structure 19. The plurality of planet gears 42 is constrained within a planet carrier 46, which is coupled to the fan shaft 48, and the sun gear 40 is coupled with a flex coupling 345 to the low-pressure shaft 36. Although not shown in FIG. 6, the fan shaft 48 may be coupled with a fan frame to the engine static structure, such as described with respect to FIGS. 4 and 5.

The gearbox assembly 38 may include an oil transfer device 350. The oil transfer device 350 allows an oil flow $F_{oil}$ to flow into the gearbox assembly 38 and to lubricate the plurality of planet gears 42, which in turn lubricates the sun gear 40 and the ring gear 44. Although shown with respect to a planetary configuration, the oil transfer device 350 may be provided in a gearbox assembly 38 having a star configuration (e.g., as shown and described with respect to FIGS. 2 and 3).

FIGS. 7A to 7C illustrate degrees of freedom associated with structural stiffness K and damping coefficient C. These degrees of freedom characterize the most significant directions of movement affecting the respective stiffness or damping properties of the component as it interacts with the gearbox and engine frame(s) supporting it under loading conditions. The structural stiffness K and the damping coefficient C representations allowed the inventors to quantify the structural dynamic behavior of these degrees of freedom in a sufficiently accurate and representative manner, accounting for all factors in the component design that effects load transmission into the gearbox.

In FIGS. 7A to 7C, the Z-axis coincides with the engine centerline A (FIG. 1), the Y-axis extends perpendicular to the Z-axis in a radial direction (the radial direction upward and downward as shown in FIG. 1), and the X-axis extends perpendicular to the Z-axis in a radial direction (the radial direction into and out of the page as shown in FIG. 1).

In FIG. 7A, the lateral stiffness $K^L$ and the lateral damping $C^L$ affect the lateral stiffness and the lateral damping of the respective mounting component (e.g., the flex mount, the fan frame, and the flex coupling). This results in the lateral stiffness $K^L$ and the lateral damping $C^L$ affecting the movement of the respective component in the lateral direction. The lateral direction includes the linear motion of the component in a Y-axis radial direction 700 and an X-axis radial direction 710.

In FIG. 7B, the bending stiffness $K^B$ and the bending damping $C^B$ affect the bending stiffness and the bending damping of the respective mounting component (e.g., the flex mount, the fan frame, and the flex coupling). This results in the bending stiffness $K^B$ and the bending damping $C^B$ affecting the rotational movement of the respective component in the bending direction. The bending direction includes the bending or rotational motion of the component in a yaw direction 720 and a pitch direction 730.

In FIG. 7C, the torsional stiffness $K^T$ and the torsional damping $C^T$ affect the torsional stiffness and the torsional damping of the respective mounting component (e.g., the flex mount, the fan frame, and the flex coupling). This results in the torsional stiffness $K^T$ and the torsional damping $C^T$ affecting the rotational movement of the respective component in a torsional direction 740 about the engine centerline (e.g., about the centerline A or Z-axis as shown in FIG. 1). This represents the load path of the gears and the torque of the respective component with respect to the fan 14 (FIG. 1).

Figure 8:
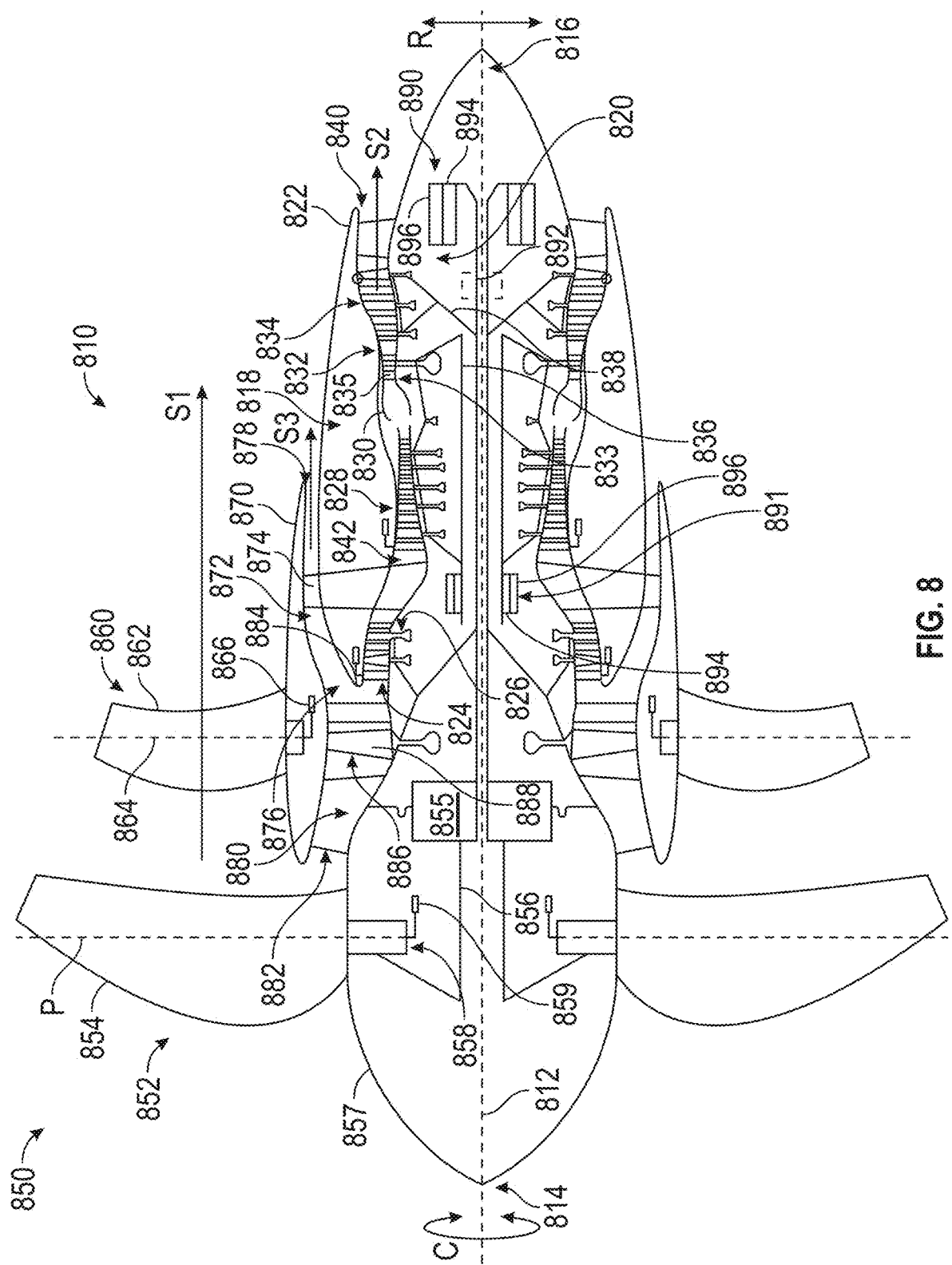
FIG. 8 shows a schematic view of a gas turbine engine, according to an embodiment of the present disclosure.

FIG. 8 shows a schematic view of a gas turbine engine 810, according to an embodiment of the present disclosure. The gas turbine engine 810 is an unducted fan engine or an open fan engine. The gas turbine engine 810 is a "three-stream engine" in that its architecture provides three distinct streams (labeled S1, S2, and S3) of thrust-producing airflow during operation, as detailed further below.

As shown in FIG. 8, the gas turbine engine 810 defines an axial direction A, a radial direction R, and a circumferential direction C. Moreover, the gas turbine engine 810 defines a longitudinal centerline axis 812 that extends along the axial direction A. In general, the axial direction A extends parallel to the longitudinal centerline axis 812, the radial direction R extends outward from, and inward to, the longitudinal centerline axis 812 in a direction orthogonal to the axial direction A, and the circumferential direction C extends three hundred sixty degrees (360°) around the longitudinal centerline axis 812. The gas turbine engine 810 extends between a forward end 814 and an aft end 816, e.g., along the axial direction A.

The gas turbine engine 810 includes a turbo-engine 820 and a fan assembly 850 positioned upstream thereof. Generally, the turbo-engine 820 includes a compressor section, a combustion section, a turbine section, and an exhaust section. As shown in FIG. 8, the turbo-engine 820 includes an engine core 218 and a casing, also referred to as a core cowl 822, that annularly surrounds the turbo-engine 820. The turbo-engine 820 and the core cowl 822 define a core inlet 824 having an annular shape that is annular about the longitudinal centerline axis 812. The turbo-engine 820 includes a low-pressure (LP) compressor 826 (also referred to as a booster) for pressurizing the air that enters the turbo-engine 820 through the core inlet 824, a high-pressure (HP) compressor 828 that receives pressurized air from the LP compressor 826 and further increases the pressure of the air, and a combustion section 830 where fuel is injected into the pressurized air and ignited to raise the temperature and the energy level of the pressurized air, generating combustion gases.

The turbo-engine 820 also includes a high-pressure (HP) turbine 832 that receives the combustion gases from the combustion section 830 and a power turbine, also referred to as a low-pressure (LP) turbine 834 that receives the combustion gases from the HP turbine 832. The HP turbine 832 drives the HP compressor 828 through a first shaft, also referred to as a high-pressure (HP) shaft 836 (also referred to as a "high-speed shaft"). In this regard, the HP turbine 832 is drivingly coupled with the HP compressor 828. The LP turbine 834 drives the LP compressor 826 and components of the fan assembly 850 through a second shaft, also referred to as a low-pressure (LP) shaft 838 (also referred to as a "low-speed shaft"). In this regard, the LP turbine 834 is drivingly coupled with the LP compressor 826 and components of the fan assembly 850. After driving each of the HP turbine 832 and the LP turbine 834, the combustion gases exit the turbo-engine 820 through a core exhaust nozzle 840. The turbo-engine 820 defines a core duct, also referred to as a core flow passage 842 that extends between the core inlet 824 and the core exhaust nozzle 840. The core flow passage 842 is an annular duct positioned generally inward of the core cowl 822 along the radial direction R.

The fan assembly 850 includes a fan 852, also referred to as a primary fan. For the embodiment of FIG. 8, the fan 852 is an open rotor fan, also referred to as an unducted fan. However, in other embodiments, the fan 852 may be ducted, e.g., by a fan casing or a nacelle circumferentially surrounding the fan 852, similar to the embodiment of FIG. 1. The fan 852 includes a plurality of fan blades 854 (only one shown in FIG. 8) that is rotatable about the longitudinal centerline axis 812 via a fan shaft 856. As shown in FIG. 8, the fan shaft 856 is coupled with the LP shaft 838 via a speed reduction gearbox or a power gearbox, also referred to as a gearbox assembly 855, e.g., in an indirect-drive configuration.

The gearbox assembly 855 is shown schematically in FIG. 8. The gearbox assembly 855 includes a plurality of gears for adjusting the rotational speed of the fan shaft 856 and, thus, the fan 852 relative to the LP shaft 838 to a more efficient rotational fan speed. The gearbox assembly may have a gear ratio of 4:1 to 12:1, or 7:1 to 12:1, or 4:1 to 10:1, or 5:1 to 9:1, or 6:1 to 9:1, and may be configured in an epicyclic star or a planet gear configuration. Preferably, the gearbox assembly has a gear ratio of 4:1 to 10:1 for an unducted fan engine (e.g., the gas turbine engine 810). The gearbox may be a single stage gearbox or a compound gearbox (e.g., having a plurality of stages).

The fan blades 854 can be arranged in equal spacing around the longitudinal centerline axis 812. Each fan blade 854 extends outwardly from a disk 858 generally along the radial direction R. The disk 858 is covered by a fan hub 857 that is rotatable and aerodynamically contoured to promote an airflow through the plurality of fan blades 854. Each of the plurality of fan blades 854 defines a pitch axis P. For the embodiment of FIG. 8, each of the plurality of fan blades 854 of the fan 852 is rotatable about their respective pitch axis P, e.g., in unison with one another. A fan actuation system controls one or more actuators 859 to pitch the fan blades 854 about their respective pitch axis P.

The fan assembly 850 further includes a fan guide vane array 860 that includes a plurality of fan guide vanes 862 (only one shown in FIG. 8) disposed around the longitudinal centerline axis 812. For the embodiment of FIG. 8, the plurality of fan guide vanes 862 is not rotatable about the longitudinal centerline axis 812. The plurality of fan guide vanes 862 can be unshrouded as shown in FIG. 8 or can be shrouded, e.g., by an annular shroud spaced outward from the fan guide vanes 862 along the radial direction R. Each of the plurality of fan guide vanes 862 defines a vane pitch axis 864. For the embodiment of FIG. 8, each of the plurality of fan guide vanes 862 of the fan guide vane array 860 is rotatable about their respective vane pitch axis 864, e.g., in unison with one another. One or more actuators 866 are controlled to pitch the plurality of fan guide vanes 862 about their respective vane pitch axis 864. In other embodiments, each of the plurality of fan guide vanes 862 is fixed or is unable to be pitched about the vane pitch axis 864. The plurality of fan guide vanes 862 is mounted to a fan cowl 870.

The fan cowl 870 annularly encases at least a portion of the core cowl 822 and is generally positioned outward of the core cowl 822 along the radial direction R. Particularly, a downstream section of the fan cowl 870 extends over a forward portion of the core cowl 822 to define a fan duct, also referred to as a fan flow passage 872. Incoming air enters through the fan flow passage 872 through a fan flow passage inlet 876 and exits through a fan exhaust nozzle 878 to produce propulsive thrust. The fan flow passage 872 is an annular duct positioned generally outward of the core flow passage 842 along the radial direction R. The fan cowl 870 and the core cowl 822 are connected together and supported by a plurality of struts 874 (only one shown in FIG. 8) that extends substantially radially and are circumferentially spaced about the longitudinal centerline axis 812. The plurality of struts 874 is each aerodynamically contoured to direct air flowing thereby. Other struts, in addition to the plurality of struts 874, can be used to connect and to support the fan cowl 870 and the core cowl 822.

The gas turbine engine 810 also defines or includes an inlet duct 880. The inlet duct 880 extends between an engine inlet 882 and the core inlet 824 and the fan flow passage inlet 876. The engine inlet 882 is defined generally at the forward end of the fan cowl 870 and is positioned between the fan 852 and the fan guide vane array 860 along the axial direction A. The inlet duct 880 is an annular duct that is positioned inward of the fan cowl 870 along the radial direction R. Air flowing downstream along the inlet duct 880 is split, not necessarily evenly, into the core flow passage 842 and the fan flow passage 872 by a splitter 884 of the core cowl 822. The inlet duct 880 is wider than the core flow passage 842 along the radial direction R. The inlet duct 880 is also wider than the fan flow passage 872 along the radial direction R.

The fan assembly 850 also includes a mid-fan 886. The mid-fan 886 includes a plurality of mid-fan blades 888 (only one shown in FIG. 8). The plurality of mid-fan blades 888 is rotatable, e.g., about the longitudinal centerline axis 812. The mid-fan 886 is drivingly coupled with the LP turbine 834 via the LP shaft 838. The plurality of mid-fan blades 888 can be arranged in equal circumferential spacing about the longitudinal centerline axis 812. The plurality of mid-fan blades 888 is annularly surrounded (e.g., ducted) by the fan cowl 870. In this regard, the mid-fan 886 is positioned inward of the fan cowl 870 along the radial direction R. The mid-fan 886 is positioned within the inlet duct 880 upstream of both the core flow passage 842 and the fan flow passage 872. A ratio of a span of a fan blade 854 to that of a mid-fan blade 888 (a span is measured from a root to tip of the respective blade) is greater than 2 and less than 10, to achieve the desired benefits of the third stream (S3), particularly, the additional thrust it offers to the engine, which can enable a smaller diameter fan blade 854 (benefits engine installation).

Accordingly, air flowing through the inlet duct 880 flows across the plurality of mid-fan blades 888 and is accelerated downstream thereof. At least a portion of the air accelerated by the mid-fan blades 888 flows into the fan flow passage 872 and is ultimately exhausted through the fan exhaust nozzle 878 to produce propulsive thrust. Also, at least a portion of the air accelerated by the plurality of mid-fan blades 888 flows into the core flow passage 842 and is ultimately exhausted through the core exhaust nozzle 840 to produce propulsive thrust. Generally, the mid-fan 886 is a compression device positioned downstream of the engine inlet 882. The mid-fan 886 is operable to accelerate air into the fan flow passage 872, also referred to as a secondary bypass passage.

During operation of the gas turbine engine 810, an initial airflow or an incoming airflow passes through the fan blades 854 of the fan 852 and splits into a first airflow and a second airflow. The first airflow bypasses the engine inlet 882 and flows generally along the axial direction A outward of the fan cowl 870 along the radial direction R. The first airflow accelerated by the fan blades 854 passes through the fan guide vanes 862 and continues downstream thereafter to produce a primary propulsion stream or a first thrust stream S1. A majority of the net thrust produced by the gas turbine engine 810 is produced by the first thrust stream S1. The second airflow enters the inlet duct 880 through the engine inlet 882.

The second airflow flowing downstream through the inlet duct 880 flows through the plurality of mid-fan blades 888 of the mid-fan 886 and is consequently compressed. The second airflow flowing downstream of the mid-fan blades 888 is split by the splitter 884 located at the forward end of the core cowl 822. Particularly, a portion of the second airflow flowing downstream of the mid-fan 886 flows into the core flow passage 842 through the core inlet 824. The portion of the second airflow that flows into the core flow passage 842 is progressively compressed by the LP compressor 826 and the HP compressor 828 and is ultimately discharged into the combustion section 830. The discharged pressurized air stream flows downstream to the combustion section 830 where fuel is introduced to generate combustion gases or products.

The combustion section 830 defines an annular combustion chamber that is generally coaxial with the longitudinal centerline axis 812. The combustion section 830 receives pressurized air from the HP compressor 828 via a pressure compressor discharge outlet. A portion of the pressurized air flows into a mixer. Fuel is injected by a fuel nozzle (omitted for clarity) to mix with the pressurized air thereby forming a fuel-air mixture that is provided to the combustion chamber for combustion. Ignition of the fuel-air mixture is accomplished by one or more igniters (omitted for clarity), and the resulting combustion gases flow along the axial direction A toward, and into, a first stage turbine nozzle 833 of the HP turbine 832. The first stage turbine nozzle 833 is defined by an annular flow channel that includes a plurality of radially extending, circumferentially spaced nozzle vanes 835 that turn the combustion gases so that the combustion gases flow angularly and impinge upon first stage turbine blades of the HP turbine 832. The combustion gases exit the HP turbine 832 and flow through the LP turbine 834 and exit the core flow passage 842 through the core exhaust nozzle 840 to produce a core air stream, also referred to as a second thrust stream S2. As noted above, the HP turbine 832 drives the HP compressor 828 via the HP shaft 836, and the LP turbine 834 drives the LP compressor 826, the fan 852, and the mid-fan 886 via the LP shaft 838.

The other portion of the second airflow flowing downstream of the mid-fan 886 is split by the splitter 884 into the fan flow passage 872. The air enters the fan flow passage 872 through the fan flow passage inlet 876. The air flows generally along the axial direction A through the fan flow passage 872 and is ultimately exhausted from the fan flow passage 872 through the fan exhaust nozzle 878 to produce a third stream, also referred to as a third thrust stream S3.

The third thrust stream S3 is a secondary air stream that increases fluid energy to produce a minority of total propulsion system thrust. In some embodiments, a pressure ratio of the third stream is higher than that of the primary propulsion stream (e.g., a bypass or a propeller driven propulsion stream). The thrust may be produced through a dedicated nozzle or through mixing of the secondary air stream with the primary propulsion stream or a core air stream, e.g., into a common nozzle. In certain embodiments, an operating temperature of the secondary air stream is less than a maximum compressor discharge temperature for the engine. Furthermore, in certain embodiments, aspects of the third stream (e.g., airstream properties, mixing properties, or exhaust properties), and thereby a percent contribution to total thrust, are passively adjusted during engine operation or can be modified purposefully through the use of engine control features (such as fuel flow, electric machine power, variable stators, variable inlet guide vanes, valves, variable exhaust geometry, or fluidic features) to adjust or to improve overall system performance across a broad range of potential operating conditions.

The gas turbine engine 810 depicted in FIG. 8 is by way of example only. In other embodiments, the gas turbine engine 810 may have other suitable configurations. For example, the fan 852 can be ducted by a fan casing or a nacelle such that a bypass passage is defined between the fan casing and the fan cowl 870. Moreover, in other embodiments, any other suitable number or configuration of compressors, turbines, shafts, or a combination thereof may be provided. In still other embodiments, aspects of the present disclosure may be incorporated into any other suitable gas turbine engine, such as, for example, gas turbine engines defining two streams (e.g., a bypass stream and a core air stream).

Further, for the depicted embodiment of FIG. 8, the gas turbine engine 810 includes an LP electric machine 890 (e.g., a motor-generator) operably coupled with the LP shaft 838 and an HP electric machine 891 (e.g., a motor-generator) operably coupled with the HP shaft 836. In this regard, the gas turbine engine 810 is a hybrid-electric propulsion machine. While the LP electric machine 890 and the HP electric machine 891 are described herein with respect to the gas turbine engine 810, the gas turbine engine 10 of FIGS. 1 to 6 can similarly include an LP electric machine and an HP electric machine.

The LP electric machine 890 can be mechanically connected to the LP shaft 838, either directly, or indirectly, e.g., by way of a gearbox assembly 892 (shown schematically in FIG. 8). Further, although, in this embodiment the LP electric machine 890 is operatively coupled with the LP shaft 838 at an aft end of the LP shaft 838, the LP electric machine 890 can be coupled with the LP shaft 838 at any suitable location. For instance, in some embodiments, the LP electric machine 890 can be coupled with the LP shaft 838 and positioned forward of the mid-fan 886 along the axial direction A.

The HP electric machine 891 can be mechanically connected to the HP shaft 836, either directly, or indirectly, e.g., by way of a gearbox assembly (not shown in FIG. 8). Further, although, in this embodiment the HP electric machine 891 is operatively coupled with the HP shaft 836 at a forward end of the HP shaft 836, the HP electric machine 891 can be coupled with the HP shaft 836 at any suitable location. For instance, in some embodiments, the HP electric machine 891 can be coupled with the HP shaft 836 through the gearbox assembly and positioned within the core cowl 822, as detailed further below.

In some embodiments, the LP electric machine 890 can be an electric motor operable to drive or to motor the LP shaft 838 and the HP electric machine 891 can be an electric motor operable to drive or to motor the HP shaft 836. In other embodiments, the LP electric machine 890 and the HP electric machine 891 can be an electric generator operable to convert mechanical energy into electrical energy. In this way, electrical power generated by the LP electric machine 890 and the HP electric machine 891 can be directed to various engine systems or aircraft systems. In some embodiments, the LP electric machine 890 and the HP electric machine 891 can each be a motor/generator with dual functionality. The LP electric machine 890 and the HP electric machine 891 each include a rotor 894 and a stator 896. The rotor 894 of the LP electric machine 890 is coupled to the LP shaft 838 and rotates with rotation of the LP shaft 838. The rotor 894 of the HP electric machine 891 is coupled to the HP shaft 836 and rotates with rotation of the HP shaft 836. In this way, the rotor 894 rotates with respect to the stator 896, generating electrical power. Although the LP electric machine 890 and the HP electric machine 891 have been described and illustrated in FIG. 8 as having a particular configuration, the present disclosure may apply to electric machines having alternative configurations. For instance, the rotor 894 or the stator 896 may have different configurations or may be arranged in a different manner than illustrated in FIG. 8.

Figure 9A:
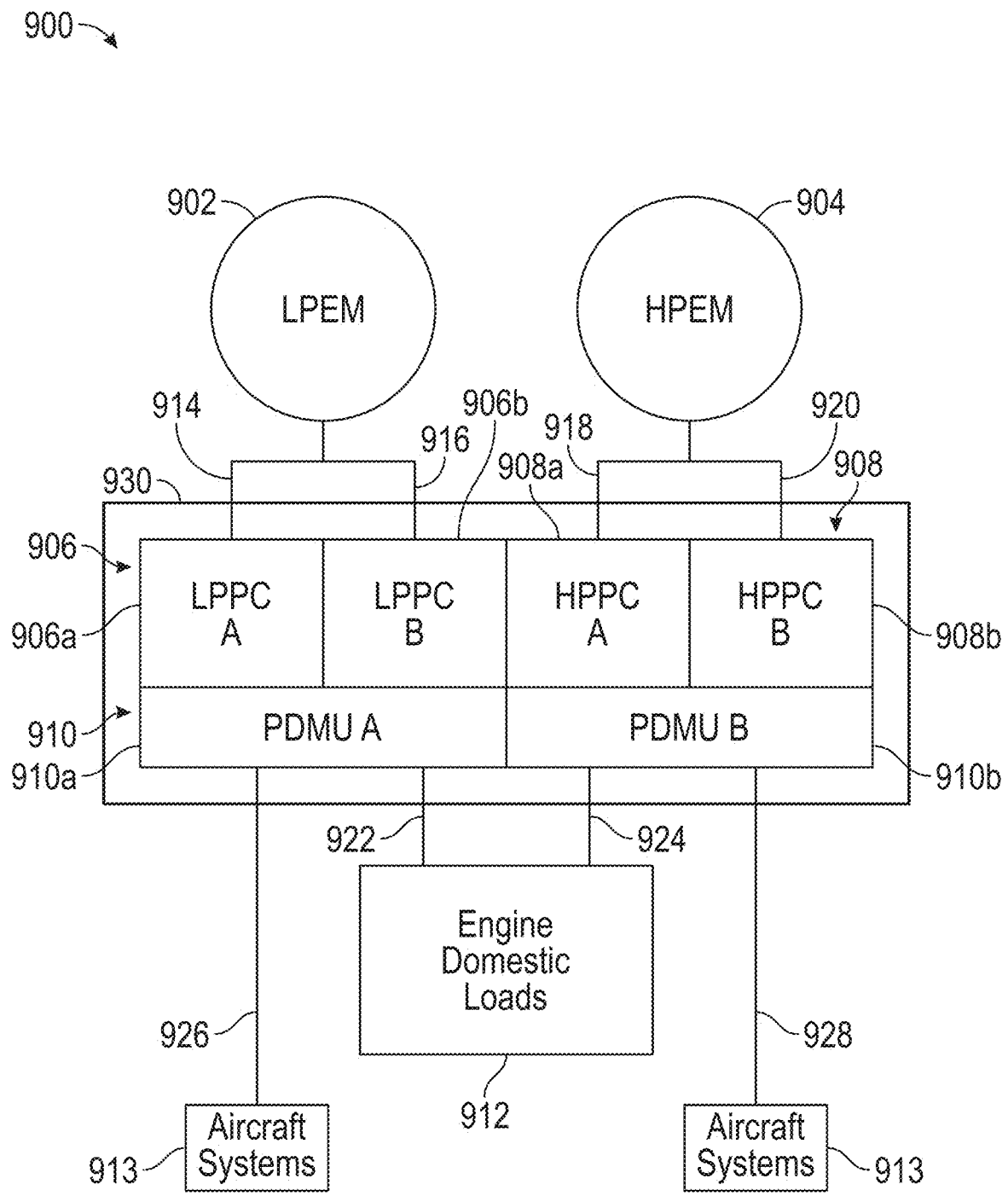
FIG. 9A shows a schematic diagram of an electric power system for the gas turbine engine of FIG. 8, according to an embodiment of the present disclosure.

FIG. 9A shows a schematic diagram of an electric power system 900 for the gas turbine engine 810 (FIG. 8), according to an embodiment of the present disclosure. The electric power system 900 includes an LP electric machine (LPEM) 902, an HP electric machine (HPEM) 904, a plurality of LP power converters (LPPCs) 906, a plurality of HP power converters (HPPCs) 908, a plurality of power distribution management units (PDMUs) 910, and an engine domestic load 912. The LP electric machine 902 can be utilized as the LP electric machine 890 in the gas turbine engine 810 of FIG. 8. The HP electric machine 904 can be utilized as the HP electric machine 891 in the gas turbine engine 810 of FIG. 8. The plurality of PDMUs 910 includes a first PDMU (PDMU A) 910a and a second PDMU (PDMU B) 910b. The engine domestic load 912 is an electrical load that includes a device or a component that is powered by electricity. For example, the engine domestic load 912 can include an engine controller, such as a full authority digital engine control (FADEC), one or more actuators on the gas turbine engine 810, or any other devices or components of the gas turbine engine 810 that are powered by electricity.

The plurality of LP power converters 906 is electrically coupled with the LP electric machine 902 and the plurality of PDMUs 910. The plurality of LP power converters 906 includes electrical circuits that convert electrical energy between alternating current (AC) and direct current (DC). The plurality of LP power converters 906 includes a first LP power converter 906a and a second LP power converter 906b. The first LP power converter 906a is electrically coupled to the LP electric machine 902 through a first plurality of AC cables 914. The first LP power converter 906*a* is also electrically coupled to the first PDMU 910*a*. The second LP power converter 906*b* is electrically coupled to the LP electric machine 902 through a second plurality of AC cables 916. The second LP power converter 906*b* is also electrically coupled to the second PDMU 910*b*.

The plurality of HP power converters 908 is electrically coupled with the HP electric machine 904 and the plurality of PDMUs 910. The plurality of HP power converters 908 includes electrical circuits that convert electrical energy between alternating current (AC) and direct current (DC). The plurality of HP power converters 908 includes a first HP power converter 908*a* and a second HP power converter 908*b*. The first HP power converter 908*a* is electrically coupled to the HP electric machine 904 through a first plurality of AC cables 918. The first HP power converter 908*a* is also electrically coupled to the first PDMU 910*a*. The second HP power converter 908*b* is electrically coupled to the HP electric machine 904 through a second plurality of AC cables 920. The second HP power converter 908*b* is also electrically coupled to the second PDMU 910*b*.

The plurality of PDMUs 910 supply the electricity from the LP electric machine 902 and the HP electric machine 904 to various electric systems, as detailed further below. For example, the PDMUs 910 can supply the electricity to the engine domestic load 912 or to one or more aircraft systems 913 on an aircraft. In particular, the first PDMU 910*a* is electrically coupled to the engine domestic load 912 through a first plurality of DC cables 922. The second PDMU 910*b* is electrically coupled to the engine domestic load 912 through a second plurality of DC cables 924. In this way, the engine domestic load 912 can be powered by at least one of the LP electric machine 902 or the HP electric machine 904. The first PDMU 910*a* is also electrically coupled to the aircraft systems 913 through a first plurality of DC cables 926. The second PDMU 910*b* is electrically coupled to the aircraft systems 913 through a second plurality of DC cables 928. The one or more aircraft systems 913 can include, for example, hydraulic pumps, actuators, lighting onboard the aircraft, avionics, galleys, entertainment systems onboard the aircraft, or any other devices or components on the aircraft that are powered by electricity.

At least two of the plurality of LP power converters 906, the plurality of HP power converters 908, or the plurality of PDMUs 910 are integrated together in a single housing. In FIG. 9A, the plurality of LP power converters 906, the plurality of HP power converters 908, and the plurality of PDMUs 910 are integrated together in a PDMU housing 930. Such a configuration of combining multiple components into a single housing reduces the weight of the electric power system and reduces thermal management weight as compared to electric power systems in which the components are in separate housings. Further, combining the components into a single housing eliminates the need for additional cables (e.g., DC cables) between the plurality of LP power converters 906 and the plurality of HP power converters 908 and the plurality of PDMUs 910, further reducing the weight of the electric power system 900.

In operation, the LP electric machine 902 and the HP electric machine 904 generate electricity as a first type of current, for example, AC power, as detailed above with respect to FIG. 8. The LP electric machine 902 supplies the electricity as the AC power to the plurality of LP power converters 906 through the first plurality of AC cables 914 and the second plurality of AC cables 916. In particular, the LP electric machine 902 supplies a first portion of the AC power to the first LP power converter 906*a* through the first plurality of AC cables 914. The LP electric machine 902 supplies a second portion of the AC power to the second LP power converter 906*b* through the second plurality of AC cables 916. The HP electric machine 904 supplies the electricity as the AC power to the plurality of HP power converters 908 through the first plurality of AC cables 918 and the second plurality of AC cables 920. In particular, the HP electric machine 904 supplies a first portion of the AC power to the first HP power converter 908*a* through the first plurality of AC cables 918. The HP electric machine 904 supplies a second portion of the AC power to the second HP power converter 908*b* through the second plurality of AC cables 920.

The plurality of LP power converters 906 convert the first type of current (AC power) to a second type of current, for example, DC power, as detailed further below. The plurality of LP power converters 906 then supply the DC power to the plurality of PDMUs 910. In particular, the first LP power converter 906*a* supplies a first portion of the DC power to the first PDMU 910*a*. The second LP power converter 906*b* supplies a second portion of the DC power to the second PDMU 910*b*.

The plurality of HP power converters 908 convert the first type of current (AC power) to the second type of current (DC power), as detailed further below. The plurality of HP power converters 908 then supply the DC power to the plurality of PDMUs 910. In particular, the first HP power converter 908*a* supplies a first portion of the DC power to the first PDMU 910*a*. The second HP power converter 908*b* supplies a second portion of the DC power to the second PDMU 910*b*.

The plurality of PDMUs 910 supply the electricity as the second type of current (DC power) to at least one of the engine domestic load 912 or the one or more aircraft systems 913. In particular, the first PDMU 910*a* supplies the DC power to the engine domestic load 912 through the first plurality of DC cables 922. The second PDMU 910*b* supplies the DC power to the engine domestic load 912 through the second plurality of DC cables 924. The first PDMU 910*a* supplies the DC power to the one or more aircraft systems 913 through the first plurality of DC cables 926. The second PDMU 910*b* supplies the DC power to one or more aircraft systems 913 through the second plurality of DC cables 928. Thus, the electric power system 900 includes at least two channels to the engine domestic load 912 (e.g., the first plurality of DC cables 922 and the second plurality of DC cables 924) and at least two channels to the one or more aircraft systems 913 (e.g., the first plurality of DC cables 926 and the second plurality of DC cables 928). Such a configuration of at least two channels provides redundancy if one channel fails or becomes damaged.

Figure 9B:
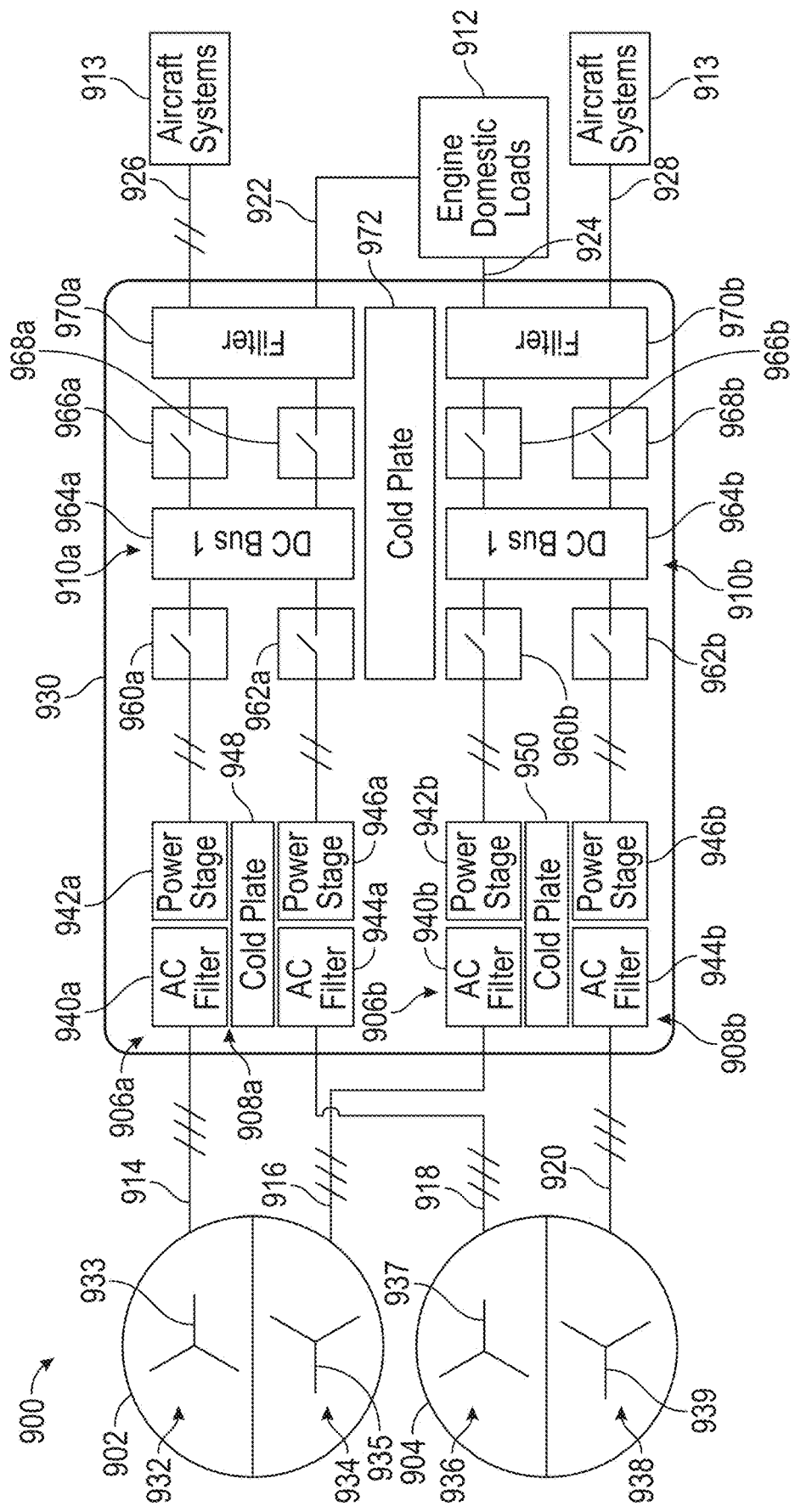
FIG. 9B shows a detailed schematic diagram of the electric power system of FIG. 9A.

FIG. 9B shows a detailed schematic diagram of the electric power system 900. As shown in FIG. 9B, the LP electric machine 902 includes a first sector 932 and a second sector 934. The first sector 932 has a first multiphase winding 933 and the second sector 934 has a second multiphase winding 935. The first multiphase winding 933 and the second multiphase winding 935 include windings or coils of the stator (e.g., the stator 896) of the LP electric machine 902 that carry the electricity generated by the LP electric machine 902. The first multiphase winding 933 is electrically coupled to the first plurality of AC cables 914 to supply the electricity (as AC power) from the LP electric machine 902 to the first LP power converter 906*a*. The second multiphase winding 935 is electrically coupled to the second plurality of AC cables 916 to supply the electricity from the LP electric machine 902 to the second LP power converter 906b.

The HP electric machine 904 includes a first sector 936 and a second sector 938. The first sector 936 has a first multiphase winding 937 and the second sector 938 has a second multiphase winding 939. The first multiphase winding 937 and the second multiphase winding 939 include windings or coils of the stator (e.g., the stator 896) of the HP electric machine 904 that carry the electricity generated by the HP electric machine 904. The first multiphase winding 937 is electrically coupled to the first plurality of AC cables 918 to supply the electricity (as AC power) from the HP electric machine 904 to the first HP power converter 908a. The second multiphase winding 939 is electrically coupled to the second plurality of AC cables 920 to supply the electricity from the HP electric machine 904 to the second HP power converter 908b.

The first LP power converter 906a includes a first AC filter 940a and a first power stage 942a. The second LP power converter 906b includes a second AC filter 940b and a second power stage 942b. The first AC filter 940a is electrically coupled to the LP electric machine 902 through the first plurality of AC cables 914. The second AC filter 940b is electrically coupled to the LP electric machine 902 through the second plurality of AC cables 916. The first AC filter 940a and the second AC filter 940b are electromagnetic interference (EMI) filters that suppress electromagnetic noise transmitted along the first plurality of AC cables 914 and the second plurality of AC cables 916, respectively. The first power stage 942a and the second power stage 942b convert the AC power from the LP electric machine 902 to DC power.

The first HP power converter 908a includes a first AC filter 944a and a first power stage 946a. The second HP power converter 908b includes a second AC filter 944b and a second power stage 946b. The first AC filter 944a is electrically coupled to the HP electric machine 904 through the first plurality of AC cables 918. The second AC filter 944b is electrically coupled to the HP electric machine 904 through the second plurality of AC cables 920. The first AC filter 944a and the second AC filter 944b are EMI filters that suppress electromagnetic noise transmitted along the first plurality of AC cables 918 and the second plurality of AC cables 920, respectively. The first power stage 946a and the second power stage 946b convert the AC power from the HP electric machine 904 to DC power.

In FIG. 9B, the first LP power converter 906a is thermally coupled with the first HP power converter 908a via a first power converter cold plate 948. The first power converter cold plate 948 cools the first LP power converter 906a and the first HP power converter 908a by transferring heat from the first LP power converter 906a and the first HP power converter 908a to a cooling device of a thermal management system, for example, through a liquid loop. The second LP power converter 906b is thermally coupled with the second HP power converter 908b via a second power converter cold plate 950. The second power converter cold plate 950 cools the second LP power converter 906b and the second HP power converter 908b by transferring heat from the second LP power converter 906b and the second HP power converter 908b to a cooling device, for example, through a liquid loop. The shared cold plates between the LP power converters 906 and the HP power converters 908 allows the power converters to balance peak power and reduce the requirement on the thermal management system to meet the mission profile of the electric power system 900, and, thus, reduces the size and the weight of the thermal management system as compared to thermal management systems without the benefit of the present disclosure.

The LP power converters 906 and the HP power converters 908 then supply the electricity as DC power to the PDMUs 910. The first PDMU 910a includes a first LP upstream switch 960a, a first HP upstream switch 962a, a first electrical power bus (DC Bus 1) 964a, a first LP downstream switch 966a, a first HP downstream switch 968a, and a first DC filter 970a. The second PDMU 910b includes a second LP upstream switch 960b, a second HP upstream switch 962b, a second electrical power bus (DC Bus 1) 964b, a second LP downstream switch 966b, a second HP downstream switch 968b, and a second DC filter 970b. The switches 960a, 960b, 962a, 962b, 966a, 966b, 968a, and 968b can include any type of switch for selectively opening or closing each channel, such as, for example, an insulated gate bipolar transistor, a power metal-oxide-semiconductor field-effect transistor (MOSFET), or the like.

The switches 960a, 960b, 962a, 962b, 966a, 966b, 968a, and 968b can be movable between a first position and a second position to selectively electrically connect the electric machines 902 and 904 to the engine domestic load 912 or the one or more aircraft systems 913 to supply the electricity to the engine domestic load 912 or the one or more aircraft systems 913. In some embodiments, the switches 960a, 960b, 962a, 962b, 966a, 966b, 968a, and 968b are movable between the first position and the second position depending on whether faults are detected within the electric power system 900. For example, the switches 960a, 960b, 962a, 962b, 966a, 966b, 968a, and 968b can be positioned in the first position (e.g., an open position) during normal operation of each of the channels of the electric power system 900. The switches 960a, 960b, 962a, 962b, 966a, 966b, 968a, and 968b can be positioned in the second position (e.g., a closed positioned) if there is a fault condition in one of the respective channels. The fault condition can include, for example, faults in the electric machines 902 and 904, faults in the AC cables 914, 916, 918, and 920, faults in the power converters 906 and 908, faults in the PDMUs 910, faults in the DC cables 922, 924, 926, and 928, or faults in the engine domestic load 912 or the one or more aircraft systems 913.

The electrical power busses 964a and 964b supply the electricity (as DC power) to at least one of the engine domestic load 912 or the one or more aircraft systems 913. In particular, the first electrical power bus 964a receives electricity from the LP electric machine 902 and the HP electric machine 904 and supplies the electricity to the engine domestic load 912 through the first plurality of DC cables 922 or to the one or more aircraft systems 913 through the first plurality of DC cables 926. The second electrical power bus 964b receives electricity from the LP electric machine 902 and the HP electric machine 904 and supplies the electricity to the engine domestic load 912 through the second plurality of DC cables 924 or to the one or more aircraft systems 913 through the second plurality of DC cables 928.

The first DC filter 970a and the second DC filter 970b are EMI filters that suppress electromagnetic noise transmitted along the first plurality of DC cables 922 and 926 and the second plurality of DC cables 924 and 928, respectively.

The first PDMU 910a is thermally coupled with the second PDMU 910b via a PDMU cold plate 972. The PDMU cold plate 972 cools the first PDMU 910a and the second PDMU 910b by transferring heat from the first PDMU 910a and the second PDMU 910b to a cooling device of a thermal management system, for example, through a liquid loop. The shared cold plate between first PDMU 910a and the second PDMU 910b allows the PDMUs 910 to balance peak power and reduce the requirement on the thermal management system to meet the mission profile of the electric power system 900, and, thus, reduces the size and the weight of the thermal management system as compared to thermal management systems without the benefit of the present disclosure.

Figure 9C:
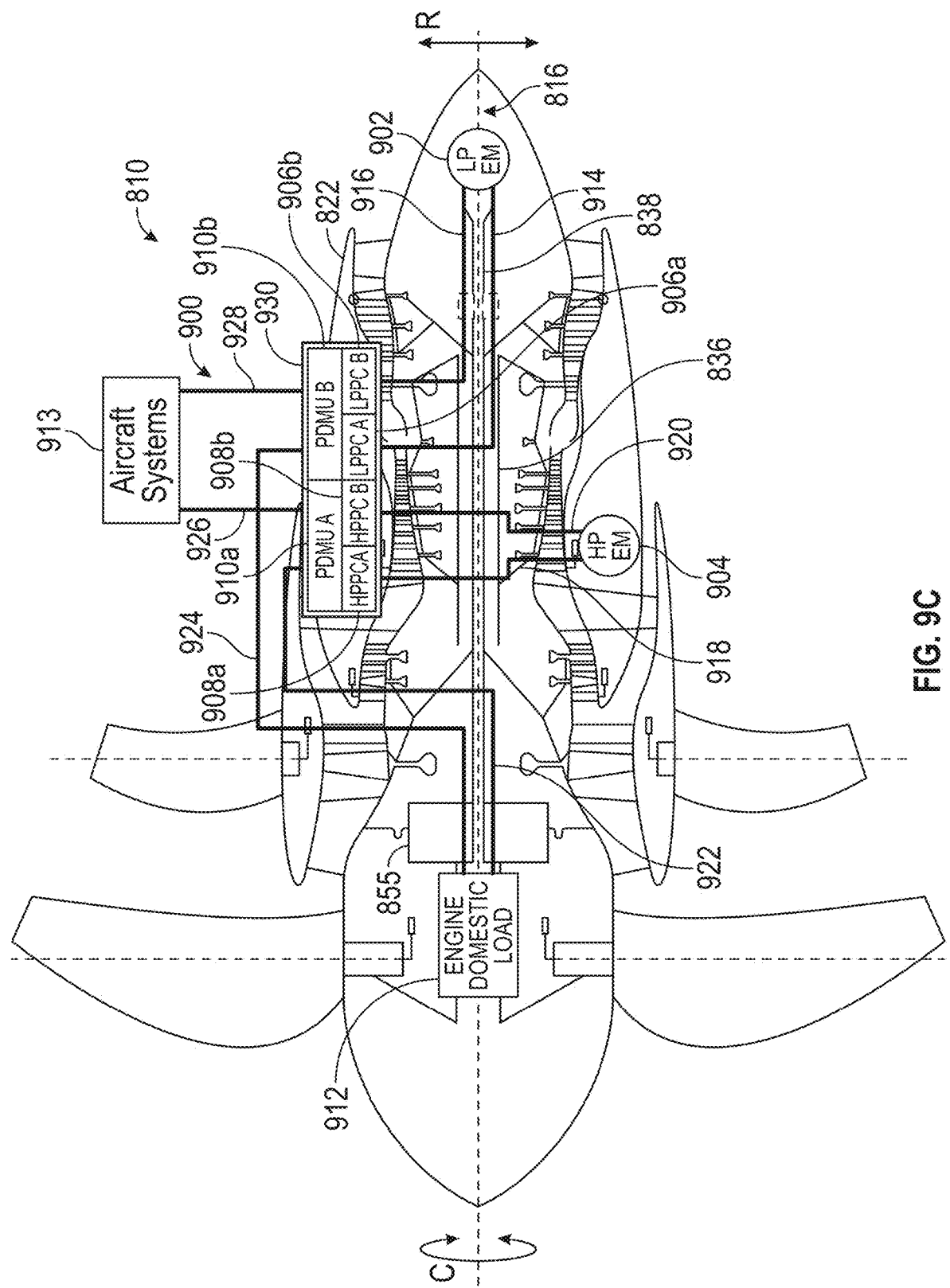
FIG. 9C shows a schematic view of the gas turbine engine of FIG. 8 having the electric power system of FIG. 9A.

FIG. 9C shows a schematic view of the gas turbine engine 810 having the electric power system 900. As shown in FIG. 9C, the LP electric machine 902 is positioned in the aft end 816 of the gas turbine engine 810. The HP electric machine 904 is positioned within the core cowl 822 in a bottom portion of the gas turbine engine 810. In such embodiments, the HP electric machine 904 can be coupled to the HP shaft 836 via a gearbox assembly. The PDMU housing 930 is positioned within the core cowl 822, for example, in a top portion of the gas turbine engine 810. In this way, the power converters 906 and 908 and the PDMUs 910 are positioned within the core cowl 822.

Figure 10A:
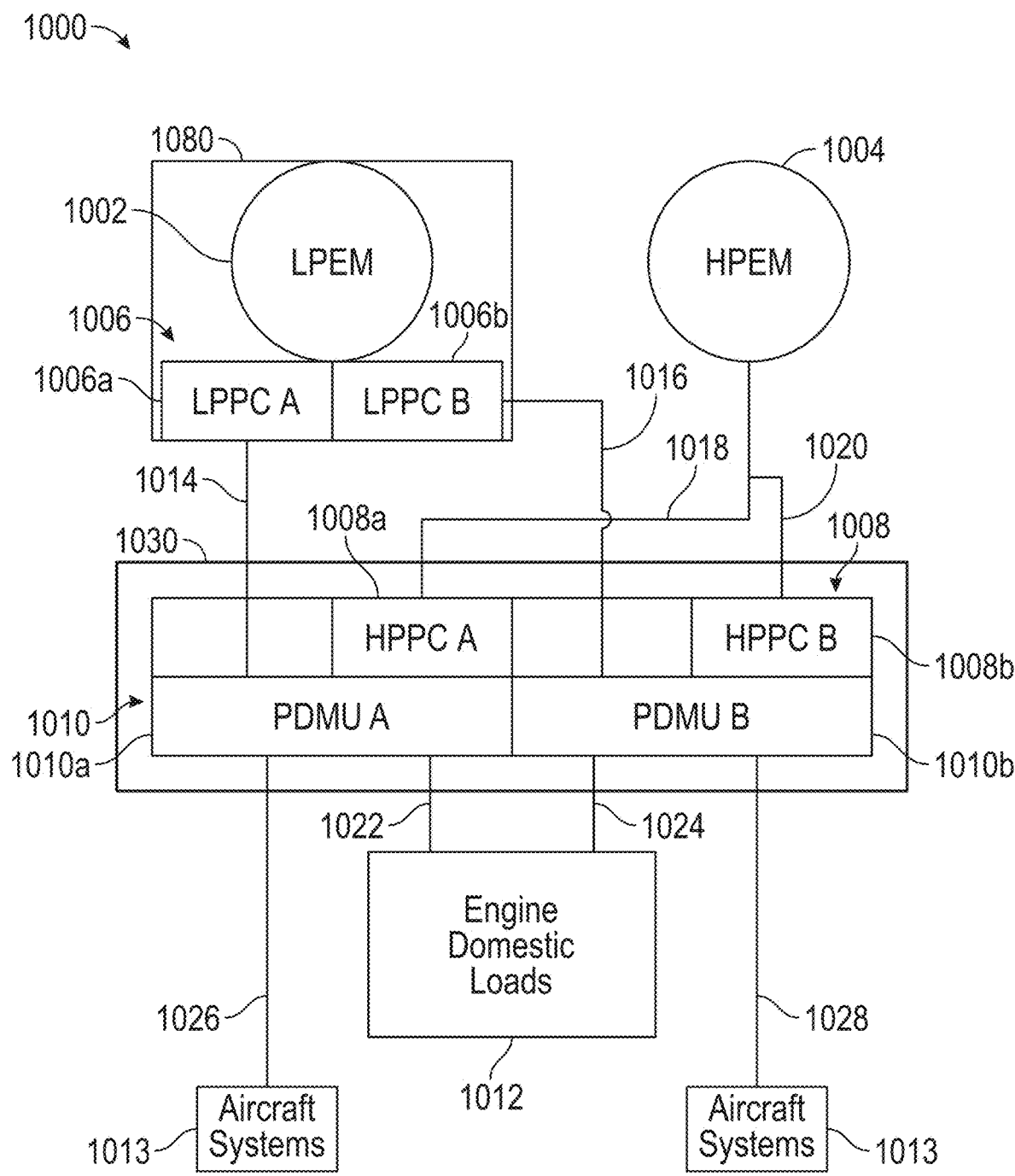
FIG. 10A shows a schematic diagram of an electric power system for the gas turbine engine of FIG. 8, according to an embodiment of the present disclosure.

FIG. 10A shows a schematic diagram of an electric power system 1000 for the gas turbine engine 810 (FIG. 8), according to an embodiment of the present disclosure. The electric power system 1000 is substantially similar to the electric power system 900 of FIGS. 9A to 9C. The same or similar reference numerals will be used for components of the electric power system 1000 that are the same as or similar to the components of the electric power system 900 discussed above, unless stated otherwise. The description of these components above also applies to this embodiment, and a detailed description of these components is omitted here.

The electric power system 1000 includes an LP electric machine 1002, an HP electric machine 1004, a plurality of LP power converters 1006, a plurality of HP power converters 1008, a plurality of PDMUs 1010, an engine domestic load 1012, and one or more aircraft systems 1013. The plurality of LP power converters 1006 includes a first LP power converter 1006a and a second LP power converter 1006b. The plurality of HP power converters 1008 includes a first HP power converter 1008a and a second HP power converter 1008b. The plurality of PDMUs 1010 includes a first PDMU 1010a and a second PDMU 1010b.

The plurality of LP power converters 1006 is electrically coupled to the plurality of PDMUs 1010 through a plurality of DC cables 1014 and 1016. In particular, the first LP power converter 1006a is electrically coupled to the first PDMU 1010a through a first plurality of DC cables 1014. The second LP power converter 1006b is electrically coupled to the second PDMU 1010b through a second plurality of DC cables 1016.

The HP electric machine 1004 is electrically coupled to the plurality of HP power converters 1008 through a plurality of AC cables 1018 and 1020 including a first plurality of AC cables 1018 and a second plurality of AC cables 1020, similar to the embodiment of FIGS. 9A to 9C. The first PDMU 1010a is electrically coupled to the engine domestic load 1012 through a first plurality of DC cables 1022. The second PDMU 1010b is electrically coupled to the engine domestic load 1012 through a second plurality of DC cables 1024. The first PDMU 1010a is electrically coupled to the one or more aircraft systems 1013 through a first plurality of DC cables 1026. The second PDMU 1010b is electrically coupled to the one or more aircraft systems 1013 through a second plurality of DC cables 1028.

In FIG. 10A, the plurality of HP power converters 1008 and the plurality of PDMUs 1010 are integrated together in a PDMU housing 1030. The LP power converters 1006 are not integrated in the PDMU housing 1030. Rather, the plurality of LP power converters 1006 is integrated together with the LP electric machine 1002 within a LP power converter housing 1080. Such a configuration eliminates the need for AC filters in the LP power converters 1006, as shown in FIG. 10B.

Figure 10B:
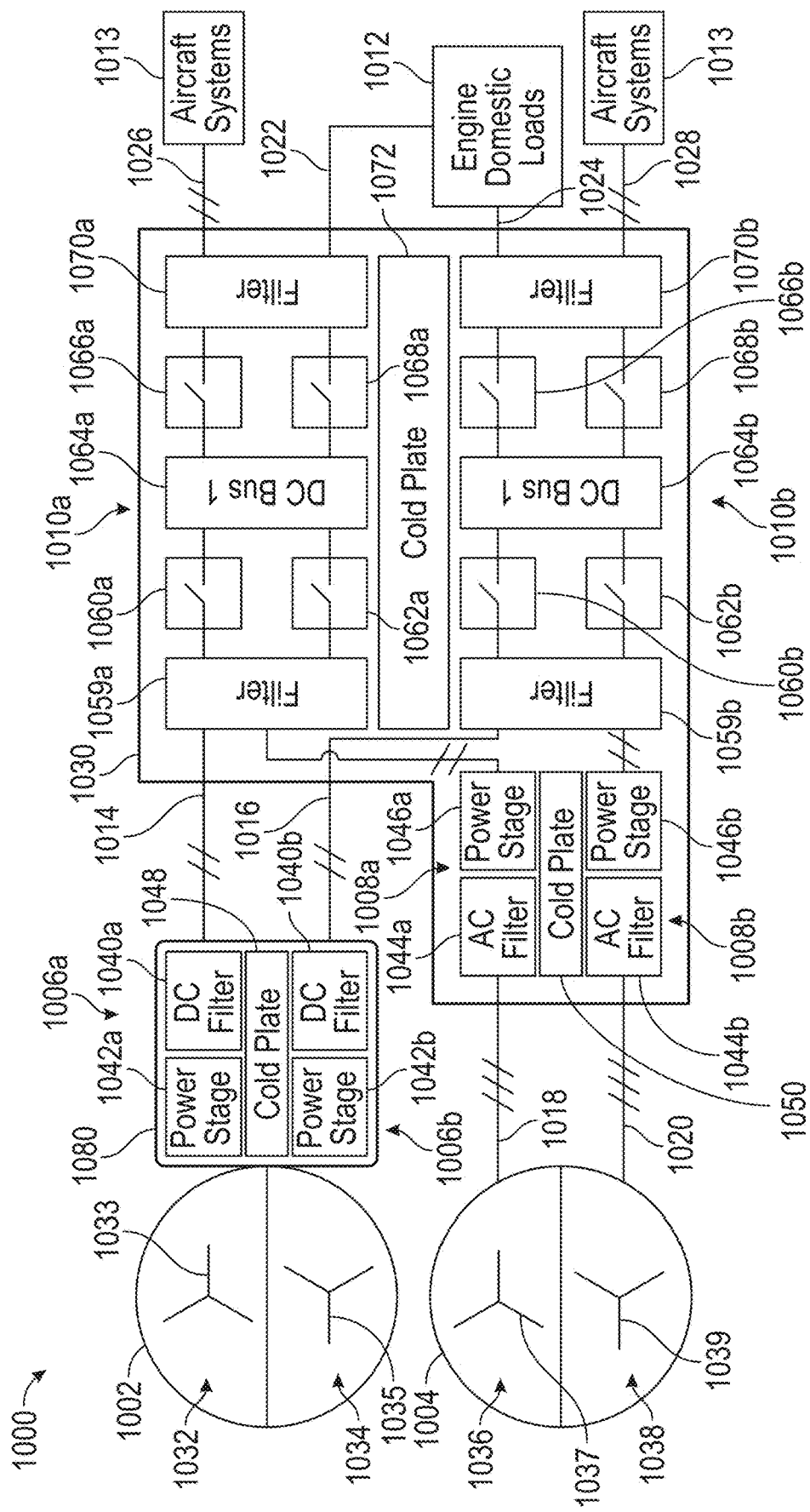
FIG. 10B shows a detailed schematic diagram of the electric power system of FIG. 10A.

FIG. 10B shows a detailed schematic diagram of the electric power system 1000. As shown in FIG. 10B, the LP electric machine 1002 includes a first sector 1032 having a first multiphase winding 1033, and a second sector 1034 having a second multiphase winding 1035. The HP electric machine 1004 includes a first sector 1036 having a first multiphase winding 1037, and a second sector 1038 having a second multiphase winding 1039.

The first LP power converter 1006a includes a first DC filter 1040a and a first power stage 1042a. The second LP power converter 1006b includes a second DC filter 1040b and a second power stage 1042b. In this way, the LP power converters 1006 do not include AC filters as the LP power converters 1006 are directly electrically coupled with the LP electric machine 1002. The DC filters 1040a and 1040b are EMI filters the suppress electromagnetic noise transmitted along the first plurality of DC cables 1014 and the second plurality of DC cables 1016. The first LP power converter 1006a is thermally coupled with the second LP power converter 1006b via a first power converter cold plate 1048.

The first HP power converter 1008a includes a first AC filter 1044a and a first power stage 1046a. The second HP power converter 1008b includes a second AC filter 1044b and a second power stage 1046b. The first HP power converter 1008a is thermally coupled with the second HP power converter 1008b via a second power converter cold plate 1050.

The first PDMU 1010a includes a first upstream DC filter 1059a, a first LP upstream switch 1060a, a first HP upstream switch 1062a, a first electrical power bus 1064a, a first LP downstream switch 1066a, a first HP downstream switch 1068a, and a first downstream DC filter 1070a. The second PDMU 1010b includes a second upstream DC filter 1059b, a second LP upstream switch 1060b, a second HP upstream switch 1062b, a second electrical power bus 1064b, a second LP downstream switch 1066b, a second HP downstream switch 1068b, and a second downstream DC filter 1070b. The first PDMU 1010a is thermally coupled with the second PDMU 1010b via a PDMU cold plate 1072.

Figure 10C:
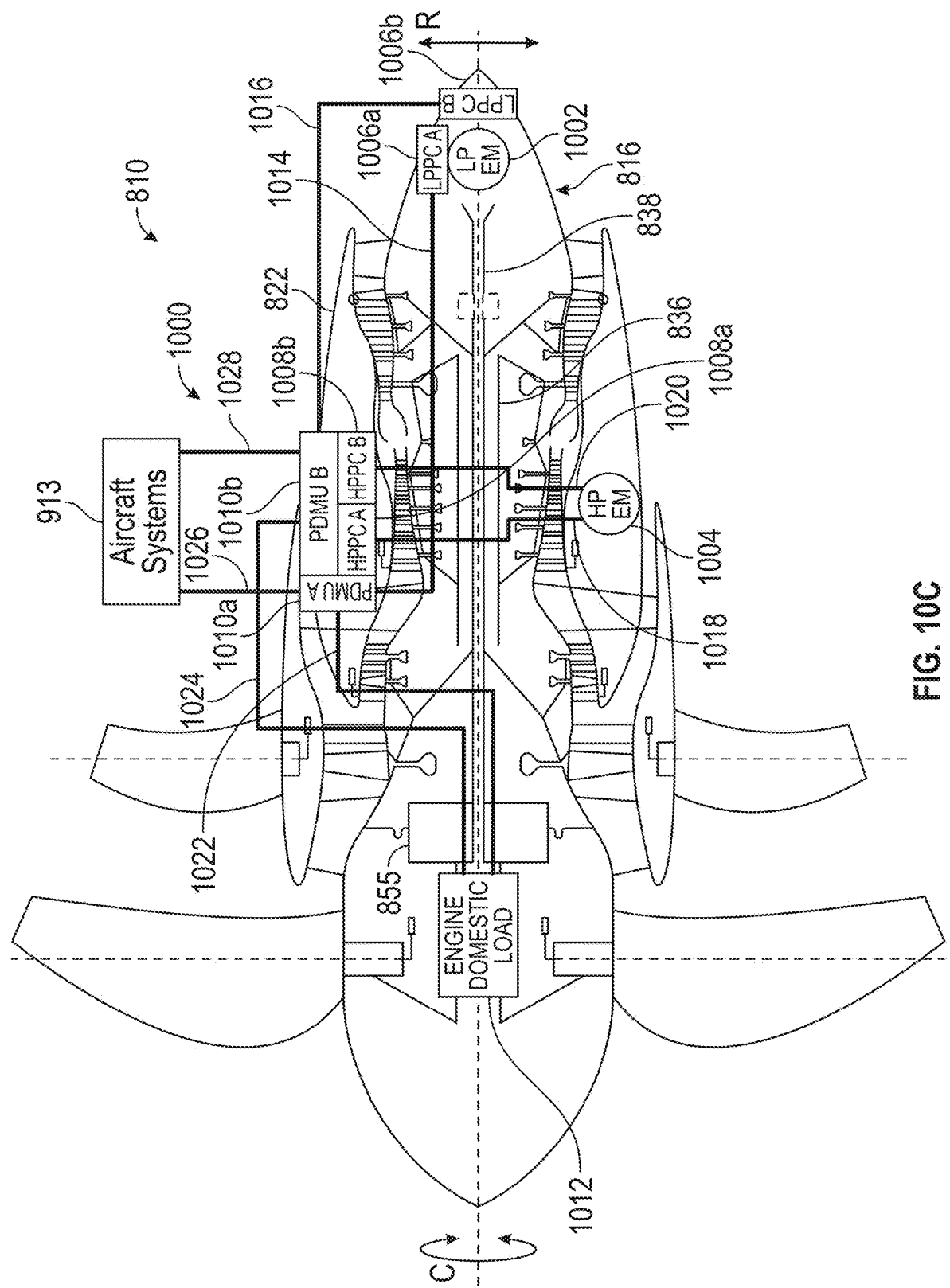
FIG. 10C shows a schematic view of the gas turbine engine of FIG. 8 having the electric power system of FIG. 10A.

FIG. 10C shows a schematic view of the gas turbine engine 810 having the electric power system 1000. As shown in FIG. 10C, the LP electric machine 1002, the first LP power converter 1006a, and the second LP power converter 1006b are positioned in the aft end 816 of the gas turbine engine 810. The HP electric machine 1004 is positioned within the core cowl 822 in a bottom portion of the gas turbine engine 810. In such embodiments, the HP electric machine 1004 can be coupled to the HP shaft 836 via a gearbox assembly. The first HP power converter 908a, the second HP power converter 908b, and the PDMUs 910a and 910b are positioned within the core cowl 822 in a top portion of the gas turbine engine 810.

Figure 11A:
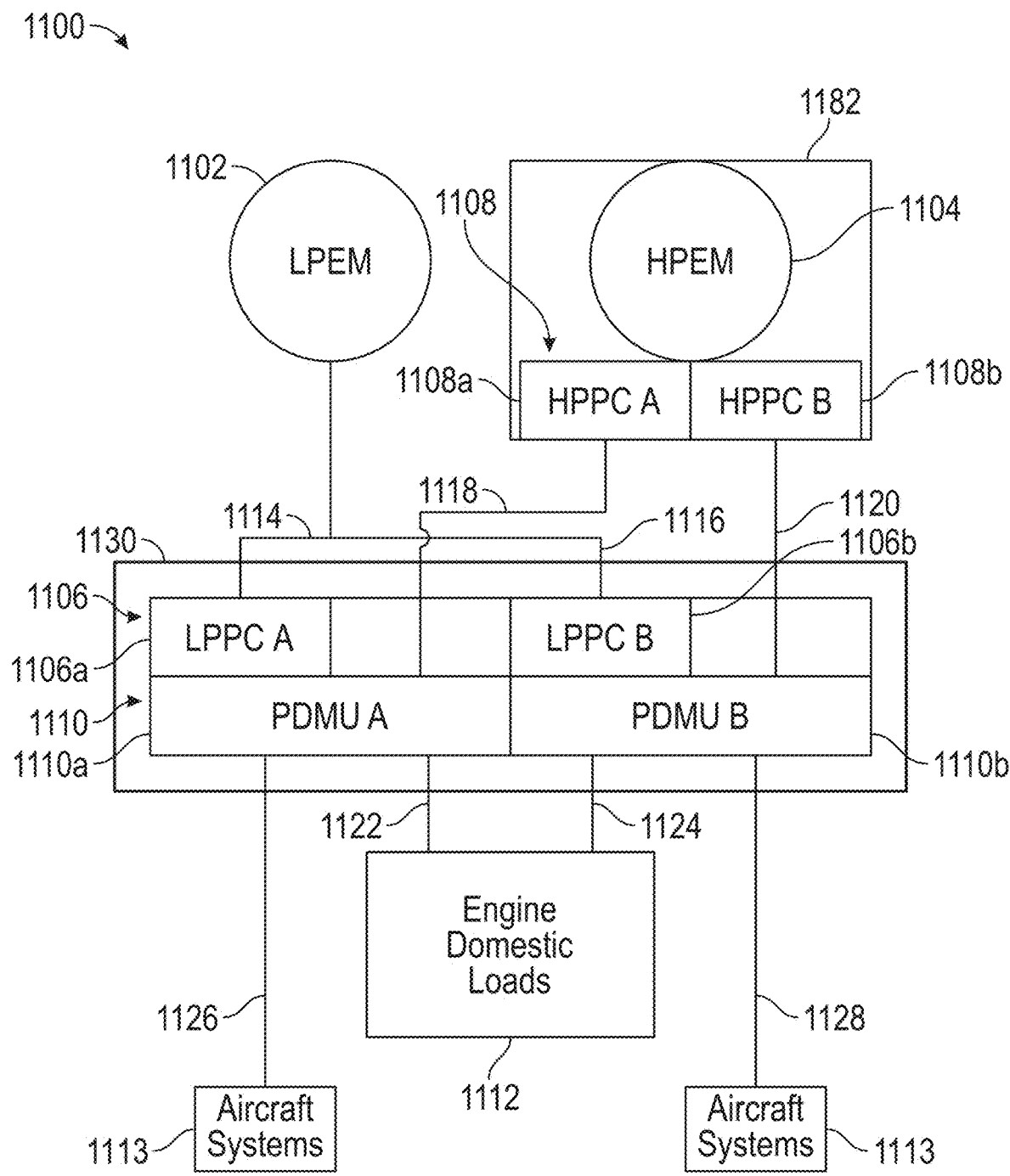
FIG. 11A shows a schematic diagram of an electric power system for the gas turbine engine of FIG. 8, according to an embodiment of the present disclosure.

FIG. 11A shows a schematic diagram of an electric power system 1100 for the gas turbine engine 810 (FIG. 8), according to an embodiment of the present disclosure. The electric power system 1100 is substantially similar to the electric power system 900 of FIGS. 9A to 9C. The same or similar reference numerals will be used for components of the electric power system 1100 that are the same as or similar to the components of the electric power system 900 discussed above, unless stated otherwise. The description of these components above also applies to this embodiment, and a detailed description of these components is omitted here.

The electric power system 1100 includes an LP electric machine 1102, an HP electric machine 1104, a plurality of LP power converters 1106, a plurality of HP power converters 1108, a plurality of PDMUs 1110, an engine domestic load 1112, and one or more aircraft systems 1113. The plurality of LP power converters 1106 includes a first LP power converter 1106a and a second LP power converter 1106b. The plurality of HP power converters 1108 includes a first HP power converter 1108a and a second HP power converter 1108b. The plurality of PDMUs 1110 includes a first PDMU 1110a and a second PDMU 1110b.

The LP electric machine 1102 is electrically coupled to the plurality of LP power converters 1106 through a plurality of AC cables 1114 and 1116 including a first plurality of AC cables 1114 and a second plurality of AC cables 1116, similar to the embodiment of FIGS. 9A to 9C. The plurality of HP power converters 1108 is electrically coupled to the plurality of PDMUs 1110 through a plurality of DC cables 1118 and 1120. In particular, the first HP power converter 1108a is electrically coupled to the first PDMU 1110a through a first plurality of DC cables 1118. The second HP power converter 1108b is electrically coupled to the second PDMU 1110b through a second plurality of DC cables 1120.

The first PDMU 1110a is electrically coupled to the engine domestic load 1112 through a first plurality of DC cables 1122. The second PDMU 1110b is electrically coupled to the engine domestic load 1112 through a second plurality of DC cables 1124. The first PDMU 1110a is electrically coupled to the one or more aircraft systems 1113 through a first plurality of DC cables 1126. The second PDMU 1110b is electrically coupled to the one or more aircraft systems 1113 through a second plurality of DC cables 1128.

In FIG. 11A, the plurality of LP power converters 1106 and the plurality of PDMUs 1110 are integrated together in a PDMU housing 1130. The HP power converters 1108 are not integrated in the PDMU housing 1130. Rather, the plurality of HP power converters 1108 is integrated together with the HP electric machine 1104 within an HP power converter housing 1182. Such a configuration eliminates the need for AC filters in the HP power converters 1108, as shown in FIG. 11B.

Figure 11B:
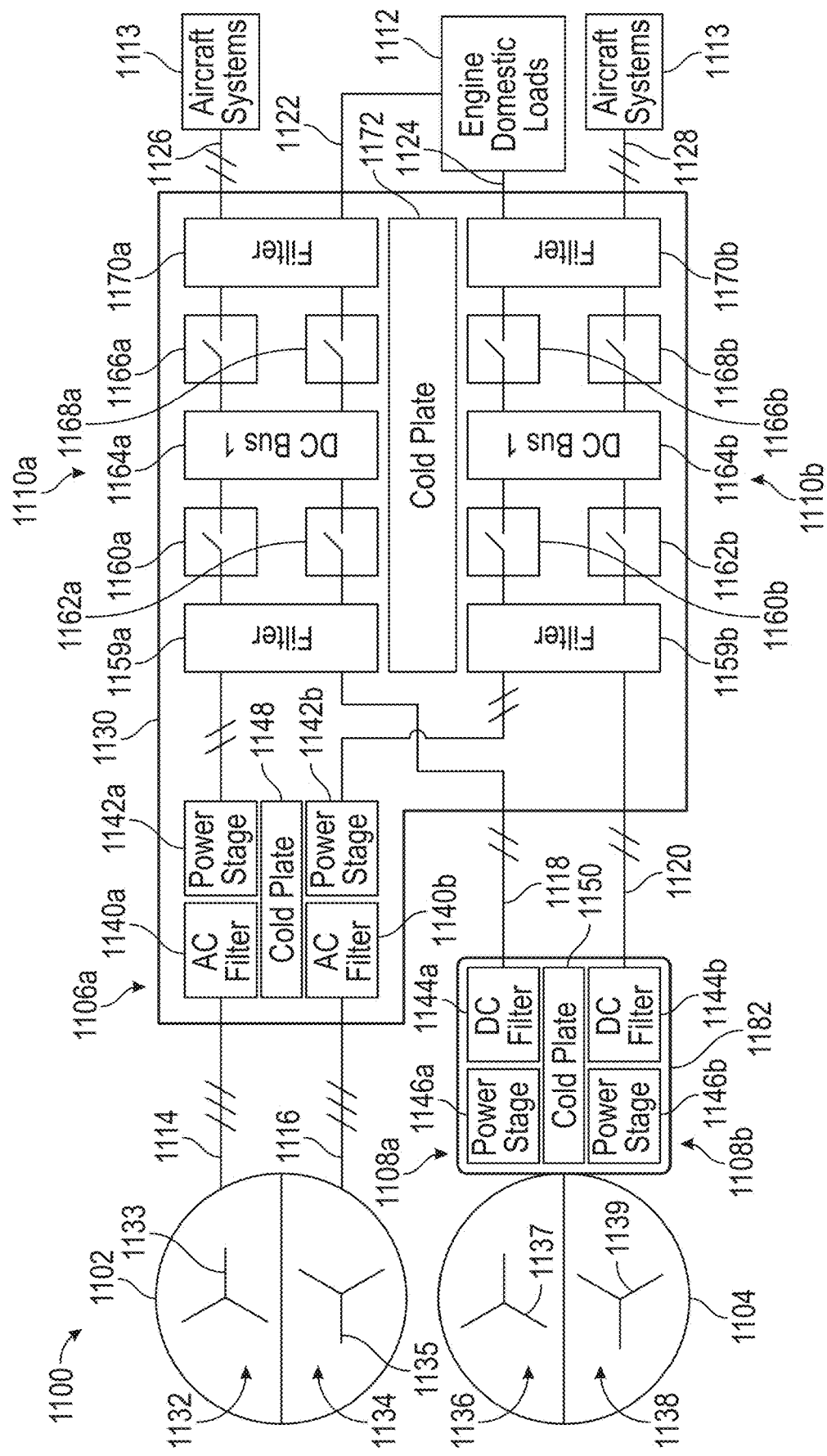
FIG. 11B shows a detailed schematic diagram of the electric power system of FIG. 11A.

FIG. 11B shows a detailed schematic diagram of the electric power system 1100. As shown in FIG. 11B, the LP electric machine 1102 includes a first sector 1132 having a first multiphase winding 1133, and a second sector 1134 having a second multiphase winding 1135. The HP electric machine 1104 includes a first sector 1136 having a first multiphase winding 1137, and a second sector 1138 having a second multiphase winding 1139.

The first LP power converter 1106a includes a first AC filter 1140a and a first power stage 1142a. The second LP power converter 1106b includes a second AC filter 1140b and a second power stage 1142b. The first LP power converter 1106a is thermally coupled with the second LP power converter 1106b via a first power converter cold plate 1148.

The first HP power converter 1108a includes a first DC filter 1144a and a first power stage 1146a. The second HP power converter 1108b includes a second DC filter 1144b and a second power stage 1146b. In this way, the HP power converters 1108 do not include AC filters as the HP power converters 1108 are directly electrically coupled with the HP electric machine 1104. The DC filters 1144a and 1144b are EMI filters the suppress electromagnetic noise transmitted along the first plurality of DC cables 1118 and the second plurality of DC cables 1120. The first HP power converter 1108a is thermally coupled with the second HP power converter 1108b via a second power converter cold plate 1150.

The first PDMU 1110a includes a first upstream DC filter 1159a, a first LP upstream switch 1160a, a first HP upstream switch 1162a, a first electrical power bus 1164a, a first LP downstream switch 1166a, a first HP downstream switch 1168a, and a first downstream DC filter 1170a. The second PDMU 1110b includes a second upstream DC filter 1159b, a second LP upstream switch 1160b, a second HP upstream switch 1162b, a second electrical power bus 1164b, a second LP downstream switch 1166b, a second HP downstream switch 1168b, and a second downstream DC filter 1170b. The first PDMU 1110a is thermally coupled with the second PDMU 1110b via a PDMU cold plate 1172.

Figure 11C:
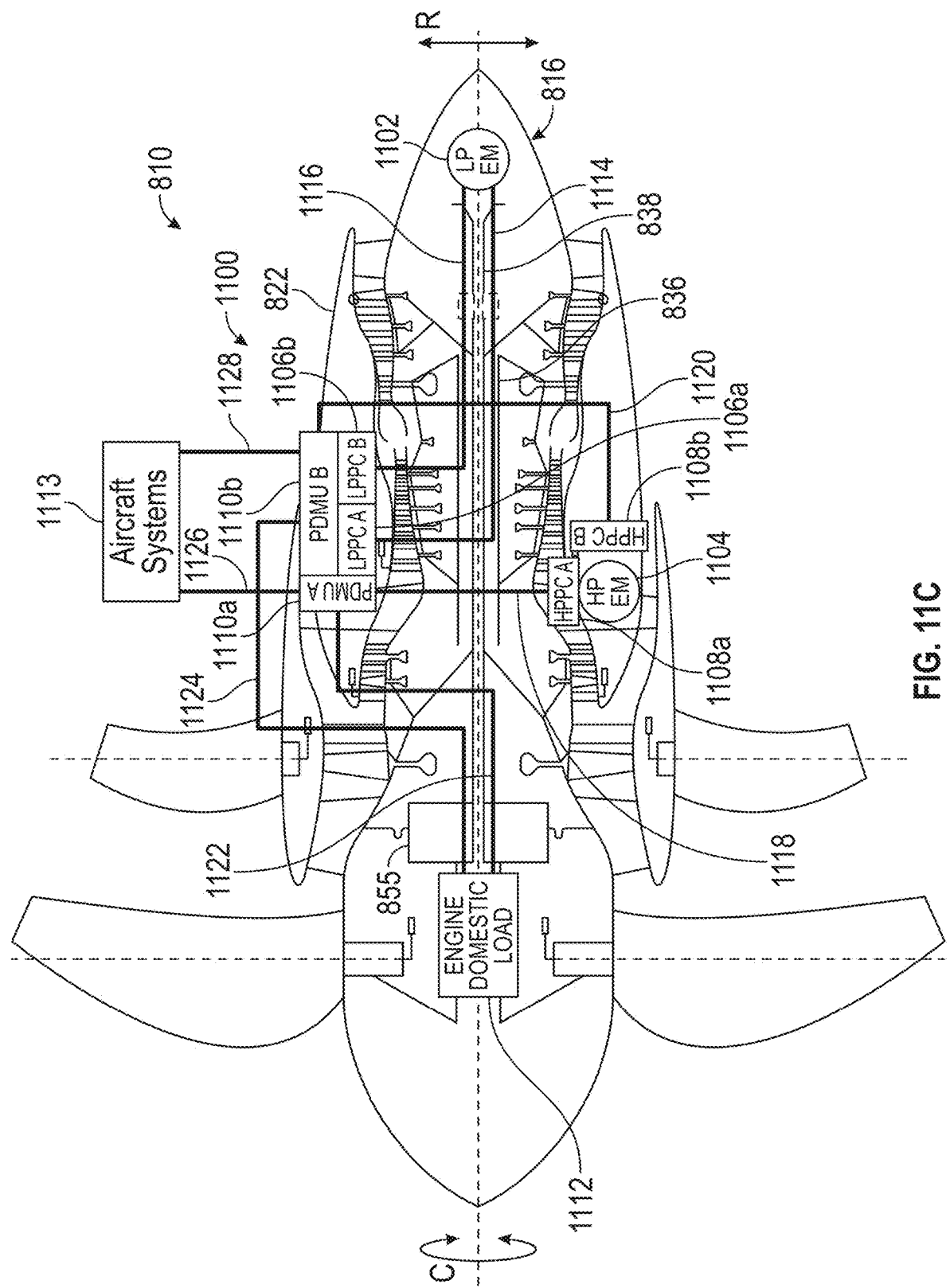
FIG. 11C shows a schematic view of the gas turbine engine of FIG. 8 having the electric power system of FIG. 11A.

FIG. 11C shows a schematic view of the gas turbine engine 810 having the electric power system 1100. As shown in FIG. 11C, the LP electric machine 1102 is positioned in the aft end 816 of the gas turbine engine 810. The HP electric machine 1104, the first HP power converter 1108a, and the second HP power converter 1108b are positioned within the core cowl 822 in a bottom portion of the gas turbine engine 810. In such embodiments, the HP electric machine 1104 can be coupled to the HP shaft 836 via a gearbox assembly. The first LP power converter 1106a, the second LP power converter 1106b, and the PDMUs 1110a and 1110b are positioned within the core cowl 822 in a top portion of the gas turbine engine 810.

Figure 12A:
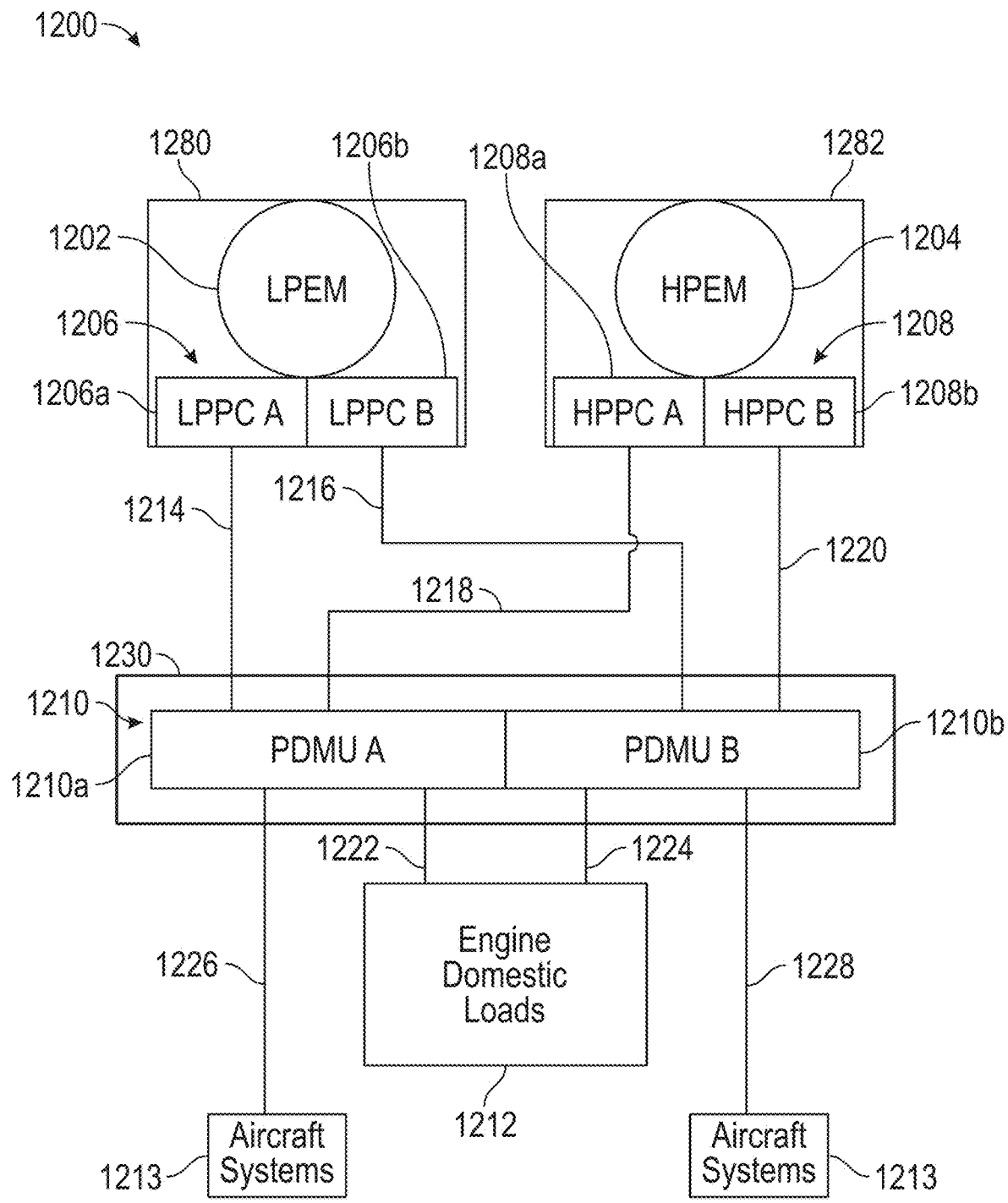
FIG. 12A shows a schematic diagram of an electric power system for the gas turbine engine of FIG. 8, according to an embodiment of the present disclosure.

FIG. 12A shows a schematic diagram of an electric power system 1200 for the gas turbine engine 810 (FIG. 8), according to an embodiment of the present disclosure. The electric power system 1200 is substantially similar to the electric power system 900 of FIGS. 9A to 9C. The same or similar reference numerals will be used for components of the electric power system 1200 that are the same as or similar to the components of the electric power system 900 discussed above, unless stated otherwise. The description of these components above also applies to this embodiment, and a detailed description of these components is omitted here.

The electric power system 1200 includes an LP electric machine 1202, an HP electric machine 1204, a plurality of LP power converters 1206, a plurality of HP power converters 1208, a plurality of PDMUs 1210, an engine domestic load 1212, and one or more aircraft systems 1213. The plurality of LP power converters 1206 includes a first LP power converter 1206a and a second LP power converter 1206b. The plurality of HP power converters 1208 includes a first HP power converter 1208a and a second HP power converter 1208b. The plurality of PDMUs 1210 includes a first PDMU 1210a and a second PDMU 1210b.

The plurality of LP power converters 1206 is electrically coupled to the plurality of PDMUs 1210 through a plurality of DC cables 1214 and 1216. In particular, the first LP power converter 1206a is electrically coupled to the first PDMU 1210a through a first plurality of DC cables 1214. The second LP power converter 1206b is electrically coupled to the second PDMU 1210b through a second plurality of DC cables 1216. The plurality of HP power converters 1208 is electrically coupled to the plurality of PDMUs 1210 through a plurality of DC cables 1218 and 1220. In particular, the first HP power converter 1208a is electrically coupled to the first PDMU 1210a through a first plurality of DC cables 1218. The second HP power converter 1208b is electrically coupled to the second PDMU 1210b through a second plurality of DC cables 1220.

The first PDMU 1210a is electrically coupled to the engine domestic load 1212 through a first plurality of DC cables 1222. The second PDMU 1210b is electrically coupled to the engine domestic load 1212 through a second plurality of DC cables 1224. The first PDMU 1210a is electrically coupled to the one or more aircraft systems 1213 through a first plurality of DC cables 1226. The second PDMU 1210b is electrically coupled to the one or more aircraft systems 1213 through a second plurality of DC cables 1228.

Figure 12B:
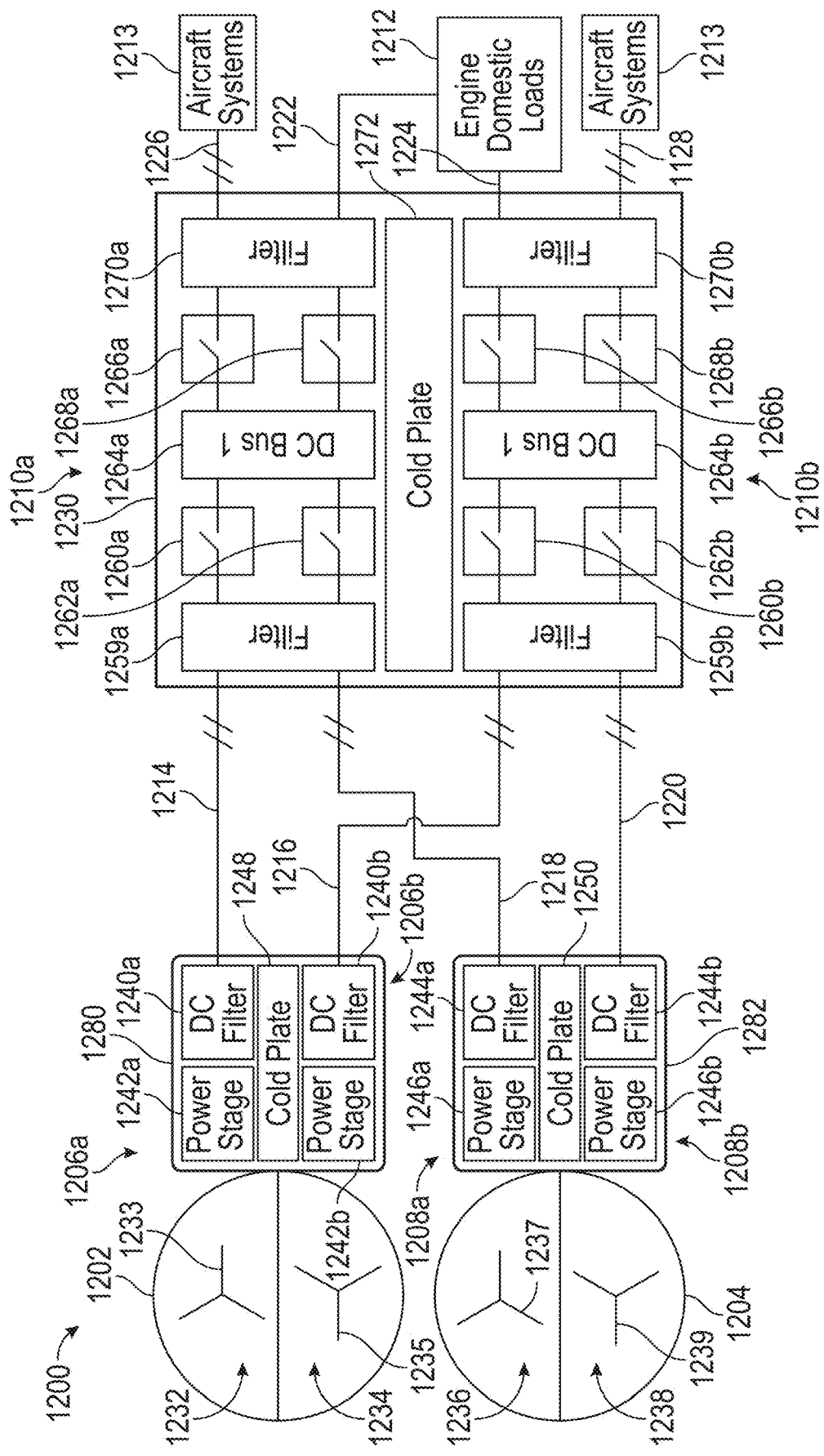
FIG. 12B shows a detailed schematic diagram of the electric power system of FIG. 12A.

In FIG. 12A, the PDMUs 1210 are integrated together in a PDMU housing 1230. The LP power converters 1206 and the HP power converters 1208 are not integrated in the PDMU housing 1230. Rather, the plurality of LP power converters 1206 is integrated together with the LP electric machine 1202 within an LP power converter housing 1280. Such a configuration eliminates the need for AC filters in the LP power converters 1206, as shown in FIG. 12B. Similarly, the plurality of HP power converters 1208 is integrated together with the HP electric machine 1204 within an HP power converter housing 1282. Such a configuration eliminates the need for AC filters in the HP power converters 1208, as shown in FIG. 12B.

FIG. 12B shows a detailed schematic diagram of the electric power system 1200. As shown in FIG. 12B, the LP electric machine 1202 includes a first sector 1232 having a first multiphase winding 1233, and a second sector 1234 having a second multiphase winding 1235. The HP electric machine 1204 includes a first sector 1236 having a first multiphase winding 1237, and a second sector 1238 having a second multiphase winding 1239.

The first LP power converter 1206a includes a first DC filter 1240a and a first power stage 1242a. The second LP power converter 1206b includes a second DC filter 1240b and a second power stage 1242b. In this way, the LP power converters 1206 do not include AC filters as the LP power converters 1206 are directly electrically coupled with the LP electric machine 1202. The first LP power converter 1206a is thermally coupled with the second LP power converter 1206b via a first power converter cold plate 1248.

The first HP power converter 1208a includes a first DC filter 1244a and a first power stage 1246a. The second HP power converter 1208b includes a second DC filter 1244b and a second power stage 1246b. In this way, the HP power converters 1208 do not include AC filters as the HP power converters 1208 are directly electrically coupled with the HP electric machine 1204. The first HP power converter 1208a is thermally coupled with the second HP power converter 1208b via a second power converter cold plate 1250.

The first PDMU 1210a includes a first upstream DC filter 1259a, a first LP upstream switch 1260a, a first HP upstream switch 1262a, a first electrical power bus 1264a, a first LP downstream switch 1266a, a first HP downstream switch 1268a, and a first downstream DC filter 1270a. The second PDMU 1210b includes a second upstream DC filter 1259b, a second LP upstream switch 1260b, a second HP upstream switch 1262b, a second electrical power bus 1264b, a second LP downstream switch 1266b, a second HP downstream switch 1268b, and a second downstream DC filter 1270b. The first PDMU 1210a is thermally coupled with the second PDMU 1210b via a PDMU cold plate 1272.

Figure 12C:
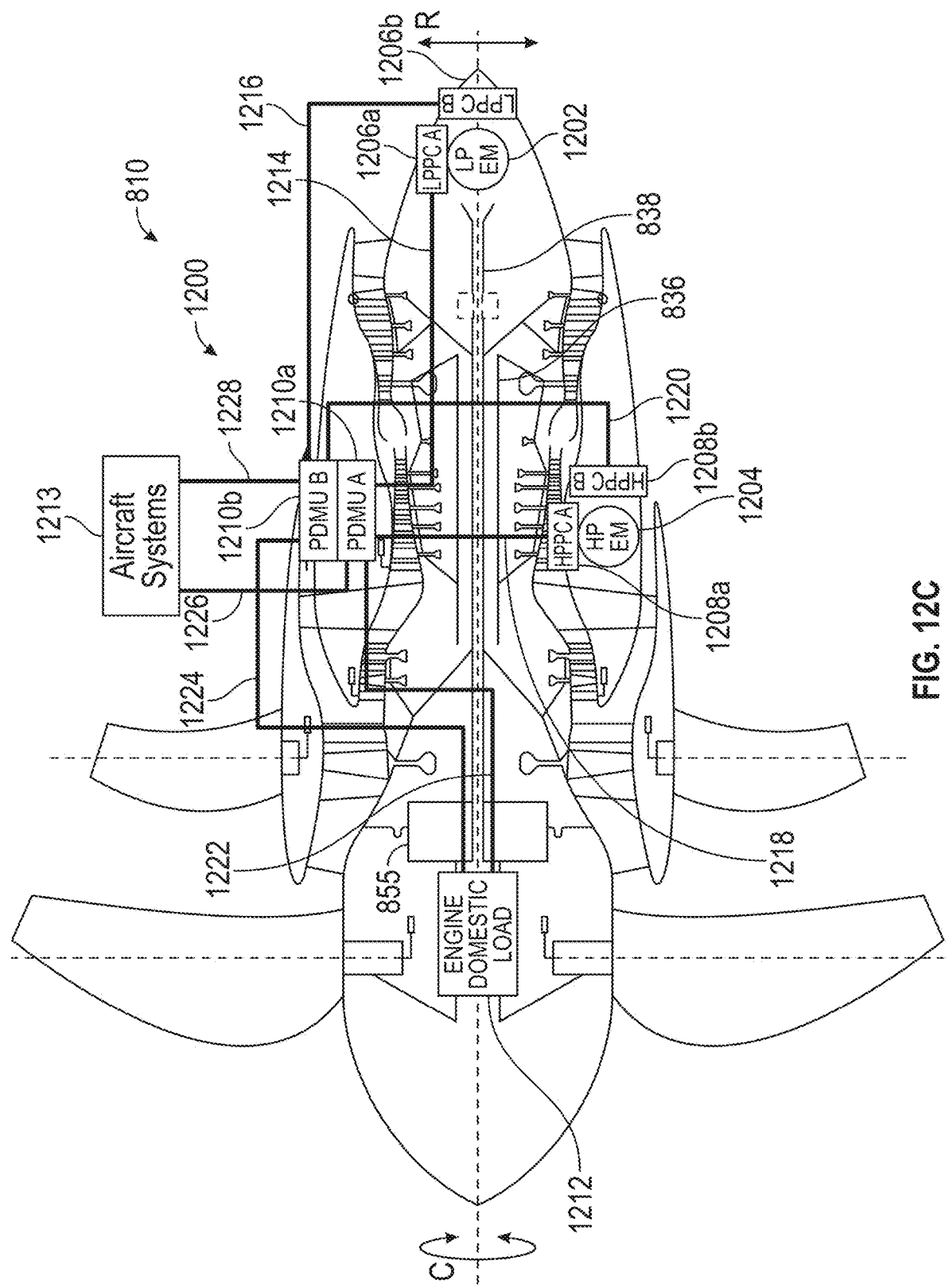
FIG. 12C shows a schematic view of the gas turbine engine of FIG. 8 having the electric power system of FIG. 12A.

FIG. 12C shows a schematic view of the gas turbine engine 810 having the electric power system 1200. As shown in FIG. 12C, the LP electric machine 1202, the first LP power converter 1206a, and the second LP power converter 1206b are positioned in the aft end 816 of the gas turbine engine 810. The HP electric machine 1204, the first HP power converter 1208a, and the second HP power converter 1208b are positioned within the core cowl 822 in a bottom portion of the gas turbine engine 810. In such embodiments, the HP electric machine 1204 can be coupled to the HP shaft 836 via a gearbox assembly. The PDMUs 910a and 910b are positioned within the core cowl 822 in a top portion of the gas turbine engine 810.

Accordingly, the configurations of the electric power systems 900, 1000, 1100, and 1200 of combining multiple components into a single housing reduces the weight of the electric power system and reduces thermal management weight as compared to electric power systems in which the components are in separate housings, while achieving a substantially same power density of and power conversion efficiency. By combining multiple components into a single housing, the filter circuitry and other circuitry for the interface between components can be eliminated, providing a further weight reduction. Further, a single mounting system can be used to mount the electric power system to the gas turbine engine, rather than a separate mounting system for each component of the electric power system, thus, further reducing the weight of the electric power system as compared to electric power systems without the benefit of the present disclosure. The vibration response of the single mounting system is similar to the vibration response of each individual mounting system such that vibrations are damped to minimize high cycle fatigue and low cycle fatigue of the overall mounting assembly.

When developing a gas turbine engine, the interplay among components can make it particularly difficult to select or to develop one component during engine design and prototype testing, especially, when some components are at different stages of completion. For example, one or more components may be nearly complete, yet one or more other components may be in an initial or a preliminary phase, such that only one (or a few) design parameters are known. It is desired to arrive at what is possible at an early stage of design, so that the down selection of candidate optimal designs, given the tradeoffs, become more possible. Heretofore, the process has sometimes been more ad hoc, selecting one design or another without knowing the impact when a concept is first taken into consideration. For example, and referring to FIG. 1, various aspects of the fan 14 design, the nacelle 30 design, the casing 17 design, the engine static structure 19 design, the high-pressure shaft 39 design, or the low-pressure shaft 36 design may not be known, but such components impact the bending experienced by the gas turbine engine 10 and, thus, may influence the design of the mounting assembly of the gearbox assembly 38.

There is a desire to narrow the range of configurations or combination of features that can yield favorable results given the constraints of the design, feasibility, manufacturing, certification requirements, etc., early in the design selection process to avoid wasted time and effort, in addition to improving upon the types of mounting that are optimal for gearbox longevity and better suited to satisfy mission requirements. During the course of the evaluation of different embodiments as set forth above, the inventors, discovered, unexpectedly, that there exists a relationship between the stiffness of a mounting component and the damping of a mounting component, which uniquely identifies a finite and readily ascertainable (in view of this disclosure) number of embodiments suitable for a particular architecture that addresses the movement of the gears due to the loading on the engine casing. This was found to enable a better system of mounting components, more optimal to the mechanical system, compared to existing methods. The relationship defined is the dynamic stiffness that accounts for both the static and the dynamic aspects of the mechanical system (e.g., the moving gears, the static mountings, the casing, etc.). The dynamic stiffness relationship is referred to by the inventors as an Impedance Parameter (Z), and is defined according to the following relationship (1) between the structural stiffness K and the equivalent damping coefficient, also referred to as viscous damping coefficient, C:

$$\text{Impedance Parameter}(Z) = K*C \tag{1}$$

As discussed above, each of the mounting components experiences movement in three degrees of freedom: lateral, bending, and torsional. Thus, each component includes a dynamic stiffness or an Impedance Parameter for each degree of freedom. That is, each component has a lateral Impedance Parameter ($Z^L$), a bending Impedance Parameter ($Z^B$), and a torsional Impedance Parameter ($Z^T$), as defined according to the following relationships (2) to (10), where "L" refers to "lateral," "B" refers to "bending," "T" refers to "torsional," "fm" refers to "flex mount," "ff" refers to "fan frame," and "fc" refers to "flex coupling":

$$\text{Impedance Parameter}(Z_{fm}^L) = K_{fm}^L * C_{fm}^L \tag{2}$$

$$\text{Impedance Parameter}(Z_{fm}^B) = K_{fm}^B * C_{fm}^B \tag{3}$$

$$\text{Impedance Parameter}(Z_{fm}^T) = K_{fm}^T * C_{fm}^T \tag{4}$$

$$\text{Impedance Parameter}(Z_{ff}^L) = K_{ff}^L * C_{ff}^L \tag{5}$$

$$\text{Impedance Parameter}(Z_{ff}^B) = K_{ff}^B * C_{ff}^B \tag{6}$$

$$\text{Impedance Parameter}(Z_{ff}^T) = K_{ff}^T * C_{ff}^T \tag{7}$$

$$\text{Impedance Parameter}(Z_{fc}^L) = K_{fc}^L * C_{fc}^L \tag{8}$$

$$\text{Impedance Parameter}(Z_{fc}^B) = K_{fc}^B * C_{fc}^B \tag{9}$$

$$\text{Impedance Parameter}(Z_{fc}^T) = K_{fc}^T * C_{fc}^T \tag{10}$$

Thus, referring back to FIGS. 2 to 5, relationships (2), (3), and (4) define Impedance Parameters for the flex mount 147 and the flex mount 247; relationships (5), (6), and (7) define Impedance Parameters for the fan frame 149 and the fan frame 249; and relationships (8), (9), and (10) define Impedance Parameters for the flex coupling 145 and the flex coupling 245.

The mounting components described in the present disclosure do not have a true viscous damping coefficient, but instead possess structural damping, also referred to as hysteretic damping. Hysteretic damping varies directly with the magnitude of displacement and may be defined by the relationship (11):

$$\text{Damping}(C) = \frac{h}{\omega} \tag{11}$$

where "h" is the hysteretic damping coefficient and ω is the frequency of vibration. Thus, at lower vibrations the hysteretic damping tends to be greater, consistent with the magnitude of displacement expected at lower (vs. higher) vibrational frequencies. The hysteretic damping is further defined by the structural stiffness and the loss factor as shown in relationship (12).

$$\text{Hysteretic Coefficient }(h) = K*\eta \tag{12}$$

where "K" is the structural stiffness and η it is the loss factor. The loss factor is defined by the material of the component. Some exemplary loss factors are shown in Table 1.

TABLE 1

| Material | Loss Factor (η) |
|---|---|
| Aluminum | 0.3 to 10 (×10⁻⁵) |
| Lead (pure) | 5 to 30 (×10⁻²) |
| Lead (with antimony) | 1 to 4 (×10⁻²) |
| Iron | 1 to 4 (×10⁻⁴⁻) |
| Steel | 0.2 to 3 (×10⁻⁴) |

Relationship (12) may be inserted into relationship (11) to define relationship $$\text{Damping}(C) = \frac{K*\eta}{\omega} \tag{13}$$

Relationship (13) may be inserted into relationship (1) to define relationship (14):

$$\text{Impedance Parameter}(Z) = \frac{K^2 * \eta}{\omega} \tag{14}$$

Therefore, as discussed above, each of the mounting components may have an impedance parameter defined according to the following relationships (15) to (23):

$$\text{Impedance Parameter}(Z_{fm}^L) = \frac{(K_{fm}^L)^2 * \eta}{\omega} \tag{15}$$

$$\text{Impedance Parameter}(Z_{fm}^B) = \frac{(K_{fm}^B)^2 * \eta}{\omega} \tag{16}$$

$$\text{Impedance Parameter}(Z_{fm}^T) = \frac{(K_{fm}^T)^2 * \eta}{\omega} \tag{17}$$

$$\text{Impedance Parameter}(Z_{ff}^L) = \frac{(K_{ff}^L)^2 * \eta}{\omega} \tag{18}$$

$$\text{Impedance Parameter}(Z_{ff}^B) = \frac{(K_{ff}^B)^2 * \eta}{\omega} \tag{19}$$

$$\text{Impedance Parameter}(Z_{ff}^T) = \frac{(K_{ff}^T)^2 * \eta}{\omega} \tag{20}$$

$$\text{Impedance Parameter}(Z_{fc}^L) = \frac{(K_{fc}^L)^2 * \eta}{\omega} \tag{21}$$

$$\text{Impedance Parameter}(Z_{fc}^B) = \frac{(K_{fc}^B)^2 * \eta}{\omega} \tag{22}$$

$$\text{Impedance Parameter}(Z_{fc}^T) = \frac{(K_{fc}^T)^2 * \eta}{\omega} \tag{23}$$

Thus, referring back to FIGS. 2 to 5, relationships (15), (16), and (17) define Impedance Parameters for the flex mount 147 and the flex mount 247; relationships (18), (19), and (20) define Impedance Parameters for the fan frame 149 and the fan frame 249; and relationships (21), (22), and (23) define Impedance Parameters for the flex coupling 145 and the flex coupling 245.

The inventors, further discovered, during the course of optimization of, and in consideration of the different loading environments for a gearbox and associated mission requirements, that a ratio of impedance parameters provided insights on the selection of more optimal gearbox supporting components to use, versus choosing a component design without fully accounting or appreciating for the structural coupling between the components. The ratio can account for the effect that properties of one component may have on another in supporting a gearbox. The Impedance Parameter Ratio (IPR) is expressed according to relationships (24) to (29):

$$IPR^L_{\frac{fm}{ff}} = \frac{Z^L_{fm}}{Z^L_{ff}} \quad (24)$$

$$IPR^B_{\frac{fm}{ff}} = \frac{Z^B_{fm}}{Z^B_{ff}} \quad (25)$$

$$IPR^T_{\frac{fm}{ff}} = \frac{Z^T_{fm}}{Z^T_{ff}} \quad (26)$$

$$IPR^L_{\frac{fc}{ff}} = \frac{Z^L_{fc}}{Z^L_{ff}} \quad (27)$$

$$IPR^B_{\frac{fC}{ff}} = \frac{Z^B_{fc}}{Z^B_{ff}} \quad (28)$$

$$IPR^T_{\frac{fc}{ff}} = \frac{Z^T_{fc}}{Z^T_{ff}} \quad (29)$$

where relationships (24) to (26) define an IPR of the flex mount with respect to the fan frame and relationships (27) to (29) define an IPR of the flex coupling with respect to the fan frame.

The ratio of Impedance Parameters for the lateral stiffness and the bending stiffness is preferably designed to be low as compared to the fan frame. This allows the gears to move more easily together, while retaining uniform loading and reducing edge loading on gears. For example, as shown in the embodiments 1 and 2 to follow, the stiffness K of the fan frame is selected and predetermined as set forth in Table 2. The stiffness of the flex mount and the flex coupling is defined by the relationships herein, as described with respect to the embodiments to follow.

Unlike the lateral stiffness and the bending stiffness Impedance Parameter ratios, ratios for torsional stiffness are designed to be relatively high compared to the fan frame. Highly flexible torsional stiffness values for the flex coupling and the flex mount are undesirable as that leads to high stresses and introduce unwanted vibration modes into the system.

The present disclosure defines an Impedance Parameter Ratio of the three main gearbox assembly-engine interfaces (e.g., the fan frame, the flex coupling, and the flex mount). The design parameter not only accounts for stiffness, but also accounts for structural hysteresis in the form of equivalent viscous damping. The three main elements that interface the gearbox assembly are (1) the fan shaft with stiff connection to the fan frame, (2) the flex mount, and (3) the flex coupling from the input shaft. The magnitude of the ratio of Impedance Parameters is preferably made relative to the fan frame impedance as this was found to provide the most convenient indicator of relative impedance for choosing an optimal design.

The Impedance Parameter was found to be unique for two main reasons, as alluded to earlier. First, the Impedance Parameter not only accounts for structural stiffness (K), but, also for damping (C). This allows the Impedance Parameter to account for the dynamics of the mechanical system in addition to the static performance or integrity of the mechanical system. The stiffness addresses static loads and operating conditions and the damping addresses dynamic scenarios, for example, under rotation and inflight maneuvers. Second, in addition to the lateral and the rotational or the bending stiffness, the Impedance Parameter defines desirable design choices for torsional stiffness as well.

As discussed further below, the inventors have identified a range of the Impedance Parameter for each of the mounting components, with respect to one another, that enable a mounting assembly 100 and the mounting assembly 200 design such that gears of the gearbox assembly 38 are best able to maintain alignment during engine loading conditions (e.g., take off and climb). As mentioned, the lateral stiffness and the bending stiffness of each of the flex mount and the flex coupling are lower than the respective lateral stiffness and the bending stiffness of the fan frame. The ratio of the Impedance Parameter of the flex mount with respect to the fan frame for the lateral stiffness and the bending stiffness (e.g., the lateral IPR of relationship (24) and the bending IPR of relationship (25)) is less than or equal to 0.5. In some examples, the ratio is less than or equal to 0.4. In some examples, the ratio is between 0.1 and 0.5. In some examples, the ratio is between 0.1 and 0.4. In some examples, the ratio is between 0.1 and 0.5. In some examples, the ratio is between 0.1 and 0.4. In some examples, the ratio is between 0.2 and 0.5. In some examples, the ratio is between 0.3 and 0.4. In some examples, the ratio is 0.1, 0.2, 0.3, 0.4, 0.5, or any discrete value between 0.1 and 0.5.

The ratio of the Impedance Parameter of the flex coupling with respect to the fan frame for the lateral stiffness and the bending stiffness (e.g., the lateral IPR of relationship (27) and the bending IPR of relationship (28)) is less than or equal to 0.5. In some examples, the ratio is less than or equal to 0.4. In some examples, the ratio is between 0.1 and 0.5. In some examples, the ratio is between 0.01 and 0.4. In some examples, the ratio is between 0.1 and 0.5. In some examples, the ratio is between 0.1 and 0.4. In some examples, the ratio is between 0.02 and 0.5. In some examples, the ratio is between 0.3 and 0.4. In some examples, the ratio is 0.1, 0.2, 0.3, 0.4, 0.5, or any discrete value between 0.1 and 0.5.

The torsional stiffness of each of the flex mount and the flex coupling is closer to the torsional stiffness of the fan frame. The ratio of the Impedance Parameter of the flex mount with respect to the fan frame and the flex coupling with respect to the fan frame for the torsional stiffness (e.g., the IPR of relationships (26) and (29)) is greater than or equal to 0.1. In some examples, the ratio is greater than or equal to 0.4. In some examples, the ratio is between 0.1 and 0.95. In some examples, the ratio is between 0.4 and 0.95.

Tables 2 to 5 describe exemplary embodiments 1 and 2 identifying the Impedance Parameter for two engine types. The exemplary engines of embodiments 1 and 2 may be gas turbine engines. The exemplary engines of embodiments 1 and 2 may be employed with narrow body airframes or wide body airframes. The exemplary engines of embodiments 1 and 2 may include a gearbox assembly mounted with a mounting assembly 100 in a star configuration (e.g., as described with respect to FIGS. 2 and 3) or may include a gearbox assembly mounted with a mounting assembly 200 in a planetary configuration (e.g., FIGS. 4 and 5). Table 2 describes the structural stiffness K of the fan frame. The values above are exemplary for embodiments 1 and 2. Other structural stiffnesses for the fan frame may be selected. The structural stiffness of the fan frame may be defined by material properties, component dimensions, and other known factors that affect structural stiffness.

TABLE 2

| Embodiment | $K_{ff}^L$ (lb/in) | $K_{ff}^B$ (in-lb/rad) | $K_{ff}^T$ (in-lb/rad) |
|---|---|---|---|
| 1 | 1,020,408 | 448,430,493 | 1E+12 |
| 2 | 800,000 | 351,569,506 | 1E+12 |

The values for lateral, bending, and torsional structural stiffnesses of the fan frame for embodiments 1 and 2 are exemplary. The lateral structural stiffness of the fan frame may be less than or equal to 1,200,000 lb/in. In some examples, the lateral structural stiffness of the fan frame may be in the range of 400,000 lb/in to 1,200,000 lb/in, or any value or subrange therebetween. In some examples, the lateral structural stiffness of the fan frame may be in the range of 800,000 lb/in to 1,020,408 lb/in, or any value or subrange therebetween.

The bending structural stiffness of the fan frame may be less than or equal to 600,000,000 in-lb/rad. In some examples, the bending structural stiffness of the fan frame may be in the range of 200,000,000 in-lb/rad to 600,000,000 in-lb/rad, or any value or subrange therebetween. In some examples, the bending structural stiffness of the fan frame may be in the range of in the range of 351,569,506 in-lb/rad and 448,430,493 in-lb/rad, or any value or subrange therebetween.

The torsional structural stiffness of the fan frame may be 1E+12 in-lb/rad. In some examples, the torsional structural stiffness of the fan frame may be between 1E+11 in-lb/rad and 5E+12 in-lb/rad, or any value or subrange therebetween.

The lateral, bending and torsional stiffness values for the fan frame vary in this manner depending on thrust class, fan frame design, bearing placements and types of bearings supporting the gearbox position and their relative placements to the gearbox, size of the fan and other parts of engine where the fan frame is the primary loading bearing structure.

Once the fan frame values are generally known, it may be determined, using the IPR, the optimal design for the structure supporting the gearbox, starting from the general guideline of the stiffness for the flex mount and the flex coupling are lower (in the case of lateral and bending stiffness) or higher (in the case of torsional stiffness) than the fan frame. When used in combination a desirable stiffness for the flex mount and the flex coupling may be determined. For example, the relationships (15) and (18) are imported into the relationship (24) and the relationships (16) and (19) are imported into the relationship (25) to determine the structural stiffness of the flex mount in the lateral and bending directions, as defined in relationship (30). The relationships (17) and (20) are imported into the relationship (26) to determine the structural stiffness of the flex mount in the torsional direction, as defined in relationship (31).

The structural stiffness K of the flex mount is determined for steel and ground idle vibrations with an Impedance Parameter Ratio (IPR) of less than or equal to 0.5 for the lateral and bending directions and an IPR of greater than or equal to 0.01 for torsion. The loss factor η is 0.2 to 0.0003 for steel and rotational frequency of vibration ω for ground idle may be taken as 3 krpm (314 rad/sec), which represents an average low pressure turbine rotational frequency of vibration lower than or equal to that experienced at ground idle conditions. This results in a structural stiffness of the flex mount defined by the relationship (30) for lateral and bending and the relationship (31) for torsional:

$$K_{fm} \leq 0.71 K_{ff} \quad (30)$$

$$K_{fm} \geq 0.1 K_{ff} \quad (31)$$

Inserting the values of Table 2 into relationships (30) and (31), the structural stiffnesses of the flex mount are determined as shown in Table 3.

TABLE 3

| Embodiment | $K_{fm}^L$ (lb/in) | $K_{fm}^B$ (in-lb/rad) | $K_{fm}^T$ (in-lb/rad) |
|---|---|---|---|
| 1 | ≤724,489 | ≤318,385,650 | ≥1E+11 |
| 2 | ≤568,000 | ≤249,614,395 | ≥1E+11 |

The values of the structural stiffness of the flex mount for embodiments 1 and 2 are exemplary. As discussed above, the structural stiffness of the flex mount may be determined as a relationship to the structural stiffness of the fan frame. Thus, the ranges of the respective lateral structural stiffness, bending structural stiffness, and torsional structural stiffness for the fan frame set forth above may be imparted into relationships (30) and (31) to determine the ranges of the respective lateral structural stiffness, bending structural stiffness, and torsional structural stiffness for the flex mount.

A similar process is performed to arrive at the structural stiffness of the flex coupling. That is, the relationships (21) and (18) are imported into the relationship (27) and the relationships (22) and (19) are imported into the relationship (28) to determine the structural stiffness of the flex coupling in the lateral and bending directions as defined in relationship (32). The relationships (23) and (20) are imported into the relationship (29) to determine the structural stiffness of the flex coupling in the torsional direction as defined in relationship (33).

The structural stiffness K of the flex coupling is determined for steel and ground idle vibrations with an IPR of less than or equal to 0.5 for the lateral and bending directions and an IPR of greater than or equal to 0.01 for the torsional direction. The loss factor η is 0.2 to 0.0003 for steel and the frequency of vibration ω for ground idle may be taken as 3 krpm (314 rad/sec), which represents a frequency of vibration lower than or equal to that experienced at ground idle conditions. This results in a structural stiffness of the flex coupling defined by the relationship (32) for lateral and bending and the relationship (33) for torsional:

$$K_{fc} \leq 0.71 K_{ff} \quad (32)$$

$$K_{fc} \geq 0.1 K_{ff} \quad (33)$$

Inserting the values of Table 2 into relationships (32) and (33), the structural stiffnesses of the flex coupling are determined as shown in Table 4.

TABLE 4

| Embodiment | $K_{fc}^L$ (lb/in) | $K_{fc}^B$ (in-lb/rad) | $K_{fc}^T$ (in-lb/rad) |
|---|---|---|---|
| 1 | ≤724,489 | ≤318,385,650 | ≥1E+11 |
| 2 | ≤568,000 | ≤249,614,395 | ≥1E+11 |

The values of the structural stiffness of the flex coupling for embodiments 1 and 2 are exemplary. As discussed above, the structural stiffness of the flex coupling may be determined as a relationship to the structural stiffness of the fan frame. Thus, the ranges of the respective lateral structural stiffness, bending structural stiffness, and torsional structural stiffness for the fan frame set forth above may be imparted into relationships (32) and (33) to determine the ranges of the respective lateral structural stiffness, bending structural stiffness, and torsional structural stiffness for the flex coupling.

Figure 13A:
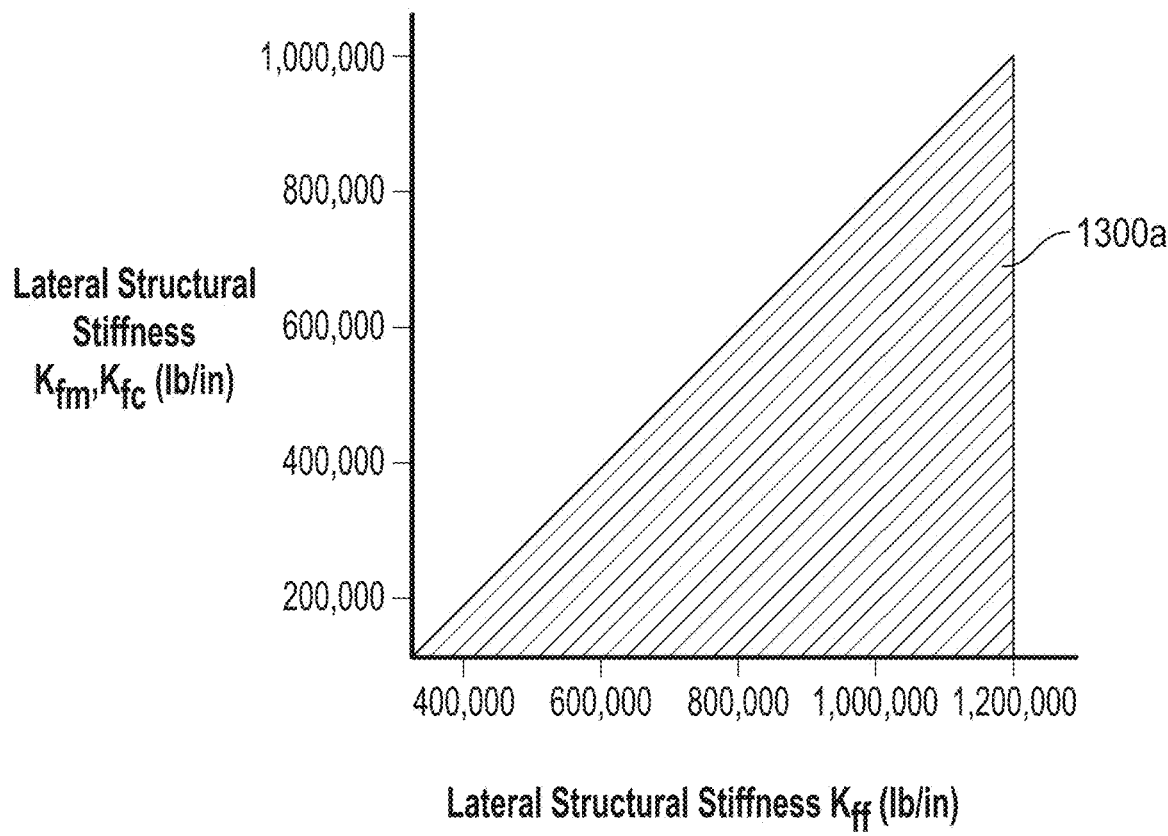
FIG. 13A shows a graph illustrating the lateral structural stiffness of the flex coupling and the flex mount as a function of the lateral structural stiffness of the fan frame.
Figure 13B:
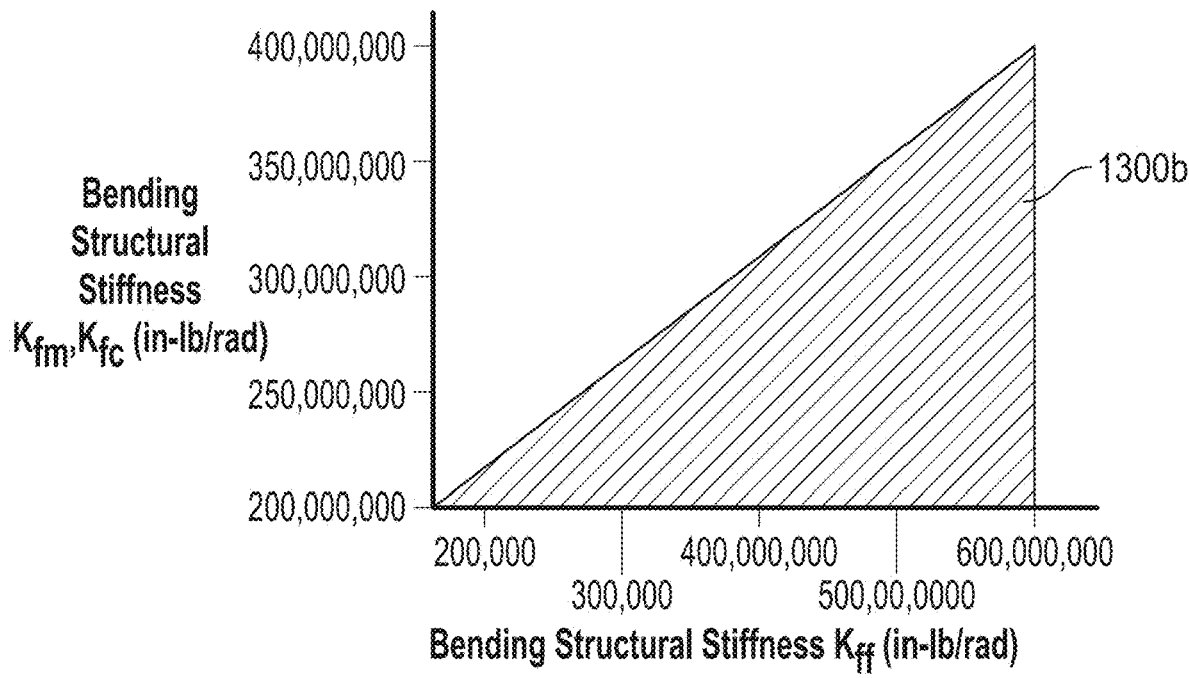
FIG. 13B shows a graph illustrating the bending structural stiffness of the flex coupling and the flex mount as a function of the bending structural stiffness of the fan frame.
Figure 13C:
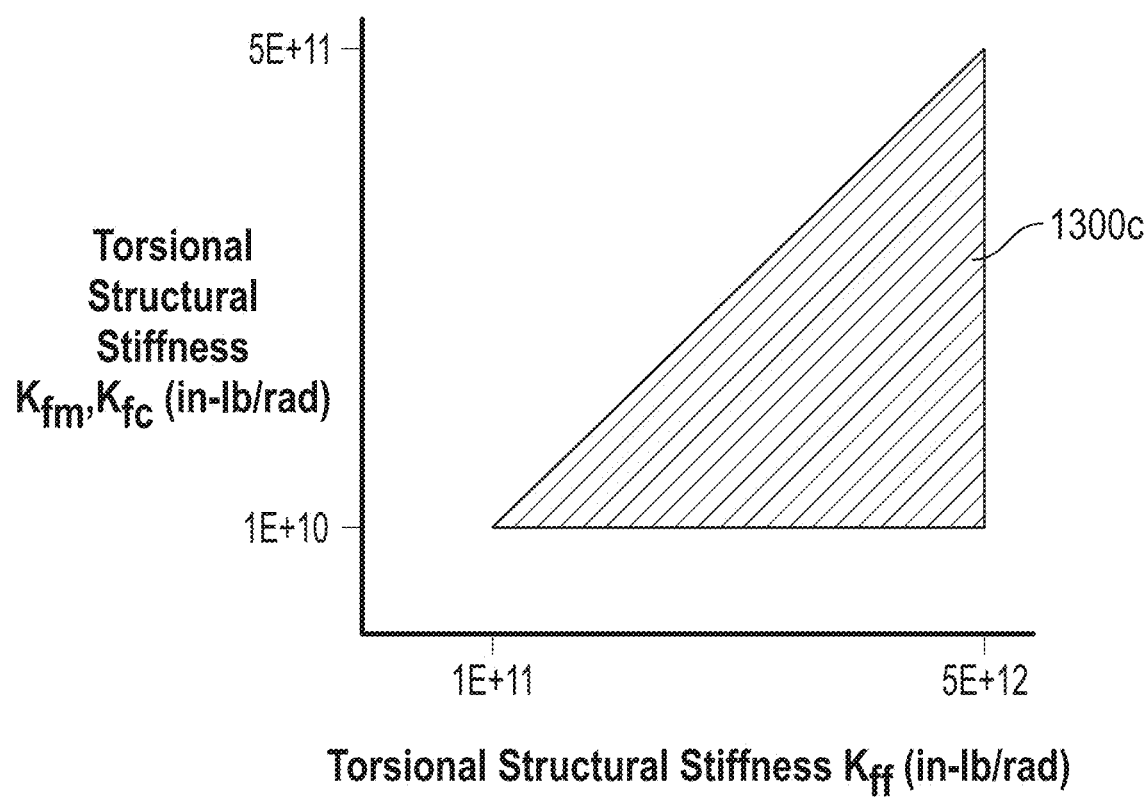
FIG. 13C shows a graph illustrating the torsional structural stiffness of the flex coupling and the flex mount as a function of the torsional structural stiffness of the fan frame.

Thus, as shown in FIGS. 13A to 13C, the structural stiffness of each of the flex coupling and the flex mount are a function or factor of the structural stiffness of the fan frame. For example, in FIG. 13A, the lateral structural stiffness of the flex mount and the flex coupling are a function of the lateral structural stiffness of the fan frame, as shown by area 1300a. In FIG. 13B, the bending structural stiffness of the flex mount and the flex coupling are a function of the bending structural stiffness of the fan frame, as shown by area 1300b. In FIG. 13C, the torsional structural stiffness of the flex mount and the flex coupling are a function of the torsional structural stiffness of the fan frame, as shown by area 1300c.

Furthermore, relying on Tables 2 to 4, the Impedance Parameter for the fan frame is determined for embodiments 1 and 2, to fall within the ranges shown in Table 5.

TABLE 5

| Embodiment | $Z_{ff}^L$ (lb/in)$^2$-s/rad | $Z_{ff}^B$ (lb-in)$^2$-s/rad$^3$ | $Z_{ff}^T$ (lb-in)$^2$-s/rad$^3$ |
|---|---|---|---|
| 1 | 9.63E+8 to 9.95E+5 | 1.28E+14 to 1.92E+11 | 6.36E+20 to 9.55E+17 |
| 2 | 4.08E+8 to 6.11E+5 | 7.87E+13 to 1.18E+11 | 6.37E+20 to 9.55E+17 |

Accordingly, as discussed above, The Impedance Parameter not only accounts for structural stiffness (K), but, also for damping (C). This allows the Impedance Parameter to account for the dynamics of the mechanical system in addition to the static performance or integrity of the mechanical system. The stiffness addresses static loads and operating conditions and the damping addresses dynamic scenarios, for example, under rotation and inflight maneuvers. In addition to the lateral and the rotational or the bending stiffness, the Impedance Parameter defines desirable design choices for torsional stiffness as well Further aspects of the present disclosure are provided by the subject matter of the following clauses.

According to an aspect of the present disclosure, a mounting assembly for a gearbox assembly of a gas turbine engine includes a flex coupling configured to mount a first gear of the gearbox assembly to a rotating shaft of the gas turbine engine, a flex mount configured to mount a second gear of the gearbox assembly to an engine static structure, and a fan frame configured to mount a third gear of the gearbox assembly to the engine static structure. Each of the flex coupling and the flex mount is characterized by a lateral impedance parameter ratio, a bending impedance parameter ratio, and a torsional impedance parameter ratio. The lateral impedance parameter ratio of the flex coupling, the flex mount, or both is less than or equal to 0.5, the bending impedance parameter ratio of the flex coupling, the flex mount, or both is less than or equal to 0.5, and the torsional impedance parameter ratio of the flex coupling, the flex mount, or both is greater than or equal to 0.01.

According to an aspect of the present disclosure, a mounting assembly for a gearbox assembly of a gas turbine engine includes a flex coupling configured to mount a first gear of the gearbox assembly to a rotating shaft of the gas turbine engine, wherein the flex coupling is characterized by a lateral impedance parameter ratio less than or equal to 0.5.

According to an aspect of the present disclosure, a mounting assembly for a gearbox assembly of a gas turbine engine includes a flex coupling configured to mount a first gear of the gearbox assembly to a rotating shaft of the gas turbine engine, wherein the flex coupling is characterized by a bending impedance parameter ratio less than or equal to 0.5.

According to an aspect of the present disclosure, a mounting assembly for a gearbox assembly of a gas turbine engine include a flex coupling configured to mount a first gear of the gearbox assembly to a rotating shaft of the gas turbine engine, wherein the flex coupling is characterized by a torsional impedance parameter ratio greater than or equal to 0.01.

According to an aspect of the present disclosure, a mounting assembly for a gearbox assembly of a gas turbine engine includes a flex mount configured to mount a first gear of the gearbox assembly to an engine static structure, wherein the flex mount is characterized by a lateral impedance parameter ratio less than or equal to 0.5.

According to an aspect of the present disclosure, a mounting assembly for a gearbox assembly of a gas turbine engine includes a flex mount configured to mount a first gear of the gearbox assembly to an engine static structure, wherein the flex mount is characterized by a bending impedance parameter ratio less than or equal to 0.5.

According to an aspect of the present disclosure, a mounting assembly for a gearbox assembly of a gas turbine engine includes a flex mount configured to mount a first gear of the gearbox assembly to an engine static structure, wherein the flex mount is characterized by a torsional impedance parameter ratio greater than or equal to 0.01.

The mounting assembly of any preceding clause, further including a flex mount configured to mount a second gear of the gearbox assembly to an engine static structure, and a fan frame configured to mount a third gear of the gearbox assembly to the engine static structure.

The mounting assembly of any preceding clause, further including a flex coupling configured to mount a second gear of the gearbox assembly to a rotating shaft of the gas turbine engine, and a fan frame configured to mount a third gear of the gearbox assembly to the engine static structure.

The mounting assembly of any preceding clause, wherein the first gear is a sun gear, the second gear is a plurality of planet gears, and the third gear is a ring gear.

The mounting assembly of any preceding clause, wherein the first gear is a sun gear, the second gear is a ring gear, and the third gear is a plurality of planet gears.

The mounting assembly of any preceding clause, wherein the gearbox assembly is arranged in a planetary configuration.

The mounting assembly of any preceding clause, wherein the gearbox assembly is arranged in a star configuration.

The mounting assembly of any preceding clause, wherein the lateral impedance parameter ratio of the flex mount is less than or equal to 0.5.

The mounting assembly of any preceding clause, wherein the bending impedance parameter ratio of the flex mount is less than or equal to 0.5.

The mounting assembly of any preceding clause, wherein the lateral impedance parameter ratio of the flex coupling is less than or equal to 0.5.

The mounting assembly of any preceding clause, wherein the bending impedance parameter ratio of the flex coupling is less than or equal to 0.5.

The mounting assembly of any preceding clause, wherein the torsional impedance parameter ratio of the flex mount is greater than or equal to 0.01.

The mounting assembly of any preceding clause, wherein the torsional impedance parameter ratio of the flex mount is between 0.01 and 0.95.

The mounting assembly of any preceding clause, wherein the torsional impedance parameter ratio of the flex coupling is greater than or equal to 0.01.

The mounting assembly of any preceding clause, wherein the torsional impedance parameter ratio of the flex mount is between 0.01 and 0.95.

The mounting assembly of any preceding clause, wherein the flex coupling is characterized by a flex coupling lateral impedance parameter, a flex coupling bending impedance parameter, and a flex coupling torsional impedance parameter, the flex mount is characterized by a flex mount lateral impedance parameter, a flex mount bending impedance parameter, and a flex mount torsional impedance parameter, and the fan frame is characterized by a fan frame lateral impedance parameter, a fan frame bending impedance parameter, and a fan frame torsional impedance parameter.

The mounting assembly of any preceding clause, wherein the fan frame has a fan frame structural stiffness and the flex mount has a flex mount structural stiffness based on the fan frame structural stiffness.

The mounting assembly of any preceding clause, wherein the fan frame structural stiffness includes a fan frame lateral structural stiffness, a fan frame bending structural stiffness, and a fan frame torsional structural stiffness, and the flex mount structural stiffness includes a flex mount lateral structural stiffness, a flex mount bending structural stiffness, and a flex mount torsional structural stiffness, wherein the flex mount lateral structural stiffness and the flex mount bending structural stiffness are less than the fan frame lateral structural stiffness and the fan frame bending structural stiffness, respectively and wherein the flex mount torsional structural stiffness is greater than the fan frame torsional structural stiffness.

The mounting assembly of any preceding clause, wherein the fan frame has a fan frame structural stiffness and the flex coupling has a flex coupling structural stiffness based on the fan frame structural stiffness.

The mounting assembly of any preceding clause, wherein the fan frame structural stiffness includes a fan frame lateral structural stiffness, a fan frame bending structural stiffness, and a fan frame torsional structural stiffness, and the flex coupling structural stiffness includes a flex coupling lateral structural stiffness, a flex coupling bending structural stiffness, and a flex coupling torsional structural stiffness, wherein the flex coupling lateral structural stiffness and the flex coupling bending structural stiffness are less than, the fan frame lateral structural stiffness and the fan frame bending structural stiffness, respectively, and wherein the flex coupling torsional structural stiffness is greater than the fan frame torsional structural stiffness.

According to an aspect of the present disclosure, a gas turbine engine including a gearbox assembly configured to transfer rotational energy from a turbine section to a fan, and a mounting assembly for coupling the gearbox assembly to the gas turbine engine, the mounting assembly having a flex coupling configured to mount a first gear of the gearbox assembly to a rotating shaft of the gas turbine engine, a flex mount configured to mount a second gear of the gearbox assembly to an engine static structure, and a fan frame configured to mount a third gear of the gearbox assembly to the engine static structure. Each of the flex coupling and the flex mount is characterized by a lateral impedance parameter ratio, a bending impedance parameter ratio, and a torsional impedance parameter ratio, and wherein the lateral impedance parameter ratio of the flex coupling, the flex mount, or both is less than or equal to 0.5, wherein the bending impedance parameter ratio of the flex coupling, the flex mount, or both is less than or equal to 0.5, and wherein the torsional impedance parameter ratio of the flex coupling, the flex mount, or both is greater than or equal to 0.01.

The gas turbine engine of the preceding clause, further including an oil transfer device configured to deliver a lubricant to the gearbox assembly.

The gas turbine engine of any preceding clause, wherein the first gear is a sun gear, the second gear is a plurality of planet gears, and the fan frame is a ring gear.

The gas turbine engine of any preceding clause, wherein the first gear is a sun gear, the second gear is a ring gear, and the third gear is a plurality of planet gears.

The gas turbine engine of any preceding clause, wherein the gearbox assembly is mounted to the gas turbine engine in a planetary configuration.

The gas turbine engine of any preceding clause, wherein the gearbox assembly is mounted to the gas turbine engine in a star configuration.

The gas turbine engine of any preceding clause, wherein the lateral impedance parameter ratio of the flex mount is less than or equal to 0.5.

The gas turbine engine of any preceding clause, wherein the bending impedance parameter ratio of the flex mount is less than or equal to 0.5.

The gas turbine engine of any preceding clause, wherein the lateral impedance parameter ratio of the flex coupling is less than or equal to 0.5.

The gas turbine engine of any preceding clause, wherein the bending impedance parameter ratio of the flex coupling is less than or equal to 0.5.

The gas turbine engine of any preceding clause, wherein the torsional impedance parameter ratio of the flex mount is greater than or equal to 0.01.

The gas turbine engine of any preceding clause, wherein the torsional impedance parameter ratio of the flex mount is between 0.01 and 0.95.

The gas turbine engine of any preceding clause, wherein the torsional impedance parameter ratio of the flex coupling is greater than or equal to 0.01.

The gas turbine engine of any preceding clause, wherein the torsional impedance parameter ratio of the flex mount is between 0.01 and 0.95.

The gas turbine engine of any preceding clause, wherein the flex coupling is characterized by a flex coupling lateral impedance parameter, a flex coupling bending impedance parameter, and a flex coupling torsional impedance parameter, the flex mount is characterized by a flex mount lateral impedance parameter, a flex mount bending impedance parameter, and a flex mount torsional impedance parameter, and the fan frame is characterized by a fan frame lateral impedance parameter, a fan frame bending impedance parameter, and a fan frame torsional impedance parameter.

The gas turbine engine of any preceding clause, wherein the fan frame has a fan frame structural stiffness and the flex mount has a flex mount structural stiffness based on the fan frame structural stiffness.

The gas turbine engine of any preceding clause, wherein the fan frame structural stiffness includes a fan frame lateral structural stiffness, a fan frame bending structural stiffness, and a fan frame torsional structural stiffness, and the flex mount structural stiffness includes a flex mount lateral structural stiffness, a flex mount bending structural stiffness, and a flex mount torsional structural stiffness, wherein the flex mount lateral structural stiffness and the flex mount bending structural stiffness are less than the fan frame lateral structural stiffness and the fan frame bending structural stiffness, respectively and wherein the flex mount torsional structural stiffness is greater than the fan frame torsional structural stiffness.

The gas turbine engine of any preceding clause, wherein the fan frame has a fan frame structural stiffness and the flex coupling has a flex mount structural stiffness based on the fan frame structural stiffness.

The gas turbine engine of any preceding clause, wherein the fan frame structural stiffness includes a fan frame lateral structural stiffness, a fan frame bending structural stiffness, and a fan frame torsional structural stiffness, and the flex coupling structural stiffness includes a flex coupling lateral structural stiffness, a flex coupling bending structural stiffness, and a flex coupling torsional structural stiffness, wherein the flex coupling lateral structural stiffness and the flex coupling bending structural stiffness are less than the fan frame lateral structural stiffness and the fan frame bending structural stiffness, respectively, and wherein the flex coupling torsional structural stiffness is greater than the fan frame torsional structural stiffness.

A gas turbine engine including a fan, a compressor section, a turbine section that includes a rotating shaft, and a combustion section in flow communication with the compressor section and the turbine section, an engine static structure, an electric power system including at least one electric machine drivingly coupled to the rotating shaft and generating electricity as a first type of current, a plurality of power converters electrically coupled with the at least one electric machine, the plurality of power converters converting the electricity as the first type of current from the at least one electric machine to a second type of current, and a plurality of power distribution management units electrically coupled with the plurality of power converters, the plurality of power distribution management units supplying the electricity as the second type of current to at least one of the gas turbine engine or one or more aircraft systems of an aircraft, wherein at least two of the plurality of power converters or the plurality of power distribution management units are integrated together in a single housing, a gearbox assembly configured to transfer rotational energy from the turbine section to the fan, and a mounting assembly for coupling the gearbox assembly to the gas turbine engine, the mounting assembly having: a flex coupling configured to mount a first gear of the gearbox assembly to the rotating shaft of the gas turbine engine, a flex mount configured to mount a second gear of the gearbox assembly to the engine static structure, and a fan frame configured to mount a third gear of the gearbox assembly to the engine static structure. Each of the flex coupling and the flex mount is characterized by a lateral impedance parameter ratio, a bending impedance parameter ratio, and a torsional impedance parameter ratio, and wherein the lateral impedance parameter ratio of the flex coupling, the flex mount, or both is less than or equal to 0.5, wherein the bending impedance parameter ratio of the flex coupling, the flex mount, or both is less than or equal to 0.5, and wherein the torsional impedance parameter ratio of the flex coupling, the flex mount, or both is greater than or equal to 0.1.

The gas turbine engine of any preceding clause, wherein at least one of the plurality of power converters is integrated together with the at least one electric machine in a power converter housing.

The gas turbine engine of any preceding clause, wherein the plurality of power converters includes a plurality of low-pressure power converters thermally coupled together by a first power converter cold plate that cools the plurality of low-pressure power converters.

The gas turbine engine of any preceding clause, wherein the plurality of power converters includes a plurality of high-pressure power converters thermally coupled together by a second power converter cold plate that cools the plurality of high-pressure power converters.

The gas turbine engine of any preceding clause, wherein the rotating shaft is a low-pressure shaft, the turbine section includes a high-pressure shaft, and the at least one electric machine includes a low-pressure electric machine drivingly coupled to the low-pressure shaft and a high-pressure electric machine drivingly coupled to the high-pressure shaft.

The gas turbine engine of any preceding clause, wherein the plurality of power converters includes a plurality of low-pressure power converters integrated together with the low-pressure electric machine in a low-pressure power converter housing.

The gas turbine engine of any preceding clause, wherein the plurality of power converters includes a plurality of high-pressure power converters integrated together with the high-pressure electric machine in a high-pressure power converter housing.

The gas turbine engine of any preceding clause, wherein the plurality of power distribution management units includes a first power distribution management unit and a second power distribution management unit that are integrated together in a power distribution management unit housing.

The gas turbine engine of any preceding clause, wherein the first power distribution management unit is thermally coupled with the second power distribution management unit via a power distribution management unit cold plate that cools the first power distribution management unit and the second power distribution management unit.

The gas turbine engine of any preceding clause, wherein at least one of the plurality of power converters is integrated together with the plurality of power distribution management units in the power distribution management unit housing.

The gas turbine engine of any preceding clause, wherein the plurality of power converters includes a first low-pressure power converter and a first high-pressure power converter thermally coupled together by a first power converter cold plate.

The gas turbine engine of any preceding clause, wherein the plurality of power converters includes a second low-pressure power converter and a second high-pressure power converter thermally coupled together by a second power converter cold plate.

A gas turbine engine including a fan, a compressor section, a turbine section that includes a low-pressure shaft and a high-pressure shaft, and a combustion section in flow communication with the compressor section and the turbine section, an engine static structure, an electric power system including a low-pressure electric machine drivingly coupled to the low-pressure shaft and generating electricity as a first type of current, a high-pressure electric machine drivingly coupled to the high-pressure shaft and generating electricity as the first type of current, a plurality of low-pressure power converters electrically coupled with the low-pressure electric machine, the plurality of low-pressure power converters converting the electricity as the first type of current from the low-pressure electric machine to a second type of current, a plurality of high-pressure power converters electrically coupled with the high-pressure electric machine, the plurality of high-pressure power converters converting the electricity as the first type of current from the high-pressure electric machine to the second type of current, and a plurality of power distribution management units electrically coupled with the plurality of low-pressure power converters and the plurality of high-pressure power converters, the plurality of power distribution management units supplying the electricity as the second type of current to at least one of the gas turbine engine or one or more aircraft systems of an aircraft, wherein the plurality of power distribution management units includes a first power distribution management unit and a second power distribution management unit that are integrated together in a power distribution management unit housing, a gearbox assembly configured to transfer rotational energy from the turbine section to the fan, and a mounting assembly for coupling the gearbox assembly to the gas turbine engine, the mounting assembly having a flex coupling configured to mount a first gear of the gearbox assembly to the low-pressure shaft of the gas turbine engine, a flex mount configured to mount a second gear of the gearbox assembly to the engine static structure, and a fan frame configured to mount a third gear of the gearbox assembly to the engine static structure. Each of the flex coupling and the flex mount is characterized by a lateral impedance parameter ratio, a bending impedance parameter ratio, and a torsional impedance parameter ratio, wherein the lateral impedance parameter ratio of the flex coupling, the flex mount, or both is less than or equal to 0.5, wherein the bending impedance parameter ratio of the flex coupling, the flex mount, or both is less than or equal to 0.5, and wherein the torsional impedance parameter ratio of the flex coupling, the flex mount, or both is greater than or equal to 0.1.

The gas turbine engine of any preceding clause, wherein at least one of the plurality of low-pressure power converters is integrated together with the low-pressure electric machine or the plurality of high-pressure power converters is integrated together with the high-pressure electric machine.

The gas turbine engine of any preceding clause, wherein the plurality of low-pressure power converters is thermally coupled together by a first power converter cold plate that cools the plurality of low-pressure power converters.

The gas turbine engine of any preceding clause, wherein the plurality of high-pressure power converters is thermally coupled together by a second power converter cold plate that cools the plurality of high-pressure power converters.

The gas turbine engine of any preceding clause, wherein the plurality of low-pressure power converters is integrated together in a low-pressure power converter housing.

The gas turbine engine of any preceding clause, wherein the plurality of high-pressure power converters is integrated together in a high-pressure power converter housing.

The gas turbine engine of any preceding clause, wherein the first power distribution management unit is thermally coupled with the second power distribution management unit via a power distribution management unit cold plate that cools the first power distribution management unit and the second power distribution management unit.

The gas turbine engine of any preceding clause, wherein at least one of the plurality of low-pressure power converters or the plurality of high-pressure power converters is integrated together with the plurality of power distribution management units in the power distribution management unit housing.

Although the foregoing description is directed to the preferred embodiments, other variations and modifications will be apparent to those skilled in the art, and may be made without departing from the disclosure. Moreover, features described in connection with one embodiment may be used in conjunction with other embodiments, even if not explicitly stated above.

The invention claimed is:

1. A gas turbine engine comprising:
   a fan, a compressor section, a turbine section that includes a rotating shaft, and a combustion section in flow communication with the compressor section and the turbine section;
   an engine static structure;
   an electric power system comprising:
   at least one electric machine drivingly coupled to the rotating shaft and generating electricity as a first type of current;
   at least one power converter electrically coupled with the at least one electric machine, the at least one power converter converting the electricity as the first type of current from the at least one electric machine to a second type of current; and
   at least one power distribution management unit electrically coupled with the at least one power converter, the at least one power distribution management unit supplying the electricity as the second type of current to at least one of the gas turbine engine or one or more aircraft systems of an aircraft,
   wherein the at least one power converter is integrated together with the at least one power distribution management unit in a power distribution management unit housing;
   a gearbox assembly configured to transfer rotational energy from the turbine section to the fan; and
   a mounting assembly for coupling the gearbox assembly to the gas turbine engine, the mounting assembly having:
   a flex coupling configured to mount a first gear of the gearbox assembly to the rotating shaft of the gas turbine engine;
   a flex mount configured to mount a second gear of the gearbox assembly to the engine static structure; and
   a fan frame configured to mount a third gear of the gearbox assembly to the engine static structure,
   wherein each of the flex coupling and the flex mount is characterized by a lateral impedance parameter ratio, a bending impedance parameter ratio, and a torsional impedance parameter ratio, and
   wherein the lateral impedance parameter ratio of the flex coupling, the flex mount, or both is less than or equal to 0.5, wherein the bending impedance parameter ratio of the flex coupling, the flex mount, or both is less than or equal to 0.5, and wherein the torsional impedance parameter ratio of the flex coupling, the flex mount, or both is greater than or equal to 0.1.

2. The gas turbine engine of claim 1, wherein the rotating shaft is a low-pressure shaft, and the at least one electric machine includes a low-pressure electric machine drivingly coupled to the low-pressure shaft.

3. The gas turbine engine of claim 1, wherein the rotating shaft is a high-pressure shaft, and the at least one electric machine includes a high-pressure electric machine drivingly coupled to the high-pressure shaft.

4. The gas turbine engine of claim 1, wherein the at least one power distribution management unit includes a first power distribution management unit and a second power distribution management unit that are integrated together in the power distribution management unit housing.

5. The gas turbine engine of claim 4, wherein the first power distribution management unit is thermally coupled with the second power distribution management unit via a power distribution management unit cold plate that cools the first power distribution management unit and the second power distribution management unit.

6. The gas turbine engine of claim 1, wherein the at least one power converter includes a first low-pressure power converter and a first high-pressure power converter thermally coupled together by a first power converter cold plate.

7. The gas turbine engine of claim 6, wherein the at least one power converter includes a second low-pressure power converter and a second high-pressure power converter thermally coupled together by a second power converter cold plate.

8. The gas turbine engine of claim 1, wherein the at least one power converter includes an alternating current filter in the power distribution management unit housing that suppresses electromagnetic noise from the at least one electric machine to the at least one power distribution management unit.

9. The gas turbine engine of claim 1, wherein the at least one power converter includes a power stage in the power distribution management unit housing that converts alternating current power from the at least one electric machine to direct current.

10. The gas turbine engine of claim 1, wherein the at least one power distribution management unit includes a plurality of switches in the power distribution management unit housing for selectively opening or closing a plurality of channels from the at least one electric machine to the at least one of the gas turbine engine or the one or more aircraft systems.

11. The gas turbine engine of claim 1, wherein the at least one power distribution management unit includes an electric power bus in the power distribution management unit housing that receives the electricity from the at least one electric machine and supplies the electricity to the at least one of the gas turbine engine or the one or more aircraft systems.

12. The gas turbine engine of claim 1, wherein the at least one power distribution management unit includes a direct current filter in the power distribution management unit housing that suppresses electromagnetic noise from the at least one power converter to the at least one of the gas turbine engine or the one or more aircraft systems.

13. A gas turbine engine comprising:
a fan, a compressor section, a turbine section that includes a low-pressure shaft and a high-pressure shaft, and a combustion section in flow communication with the compressor section and the turbine section;
an engine static structure;
an electric power system comprising:
  a low-pressure electric machine drivingly coupled to the low-pressure shaft and generating electricity as a first type of current;
  a high-pressure electric machine drivingly coupled to the high-pressure shaft and generating electricity as the first type of current;
  at least one low-pressure power converter electrically coupled with the low-pressure electric machine, the at least one low-pressure power converter converting the electricity as the first type of current from the low-pressure electric machine to a second type of current;
  at least one high-pressure power converter electrically coupled with the high-pressure electric machine, the at least one high-pressure power converter converting the electricity as the first type of current from the high-pressure electric machine to the second type of current;
  a first power distribution management unit electrically coupled with the at least one low-pressure power converter and the at least one high-pressure power converter, the first power distribution management unit supplying the electricity as the second type of current to at least one of the gas turbine engine or one or more aircraft systems of an aircraft; and
  a second power distribution management unit electrically coupled with the at least one low-pressure power converter and the at least one high-pressure power converter, the second power distribution management unit supplying the electricity as the second type of current to the at least one of the gas turbine engine or the one or more aircraft systems,
  wherein the at least one low-pressure power converter, the at least one high-pressure power converter, the first power distribution management unit, and the second power distribution management unit are integrated together in a power distribution management unit housing;
a gearbox assembly configured to transfer rotational energy from the turbine section to the fan; and
a mounting assembly for coupling the gearbox assembly to the gas turbine engine, the mounting assembly having:
  a flex coupling configured to mount a first gear of the gearbox assembly to the low-pressure shaft of the gas turbine engine;
  a flex mount configured to mount a second gear of the gearbox assembly to the engine static structure; and
  a fan frame configured to mount a third gear of the gearbox assembly to the engine static structure,
wherein each of the flex coupling and the flex mount is characterized by a lateral impedance parameter ratio, a bending impedance parameter ratio, and a torsional impedance parameter ratio, and
wherein the lateral impedance parameter ratio of the flex coupling, the flex mount, or both is less than or equal to 0.5,
wherein the bending impedance parameter ratio of the flex coupling, the flex mount, or both is less than or equal to 0.5, and
wherein the torsional impedance parameter ratio of the flex coupling, the flex mount, or both is greater than or equal to 0.1.

14. The gas turbine engine of claim 13, wherein the first power distribution management unit is thermally coupled with the second power distribution management unit via a power distribution management unit cold plate that cools the first power distribution management unit and the second power distribution management unit.

15. The gas turbine engine of claim 13, wherein the at least one low-pressure power converter and the at least one high-pressure power converter are thermally coupled together by a power converter cold plate.

16. The gas turbine engine of claim 13, wherein the at least one low-pressure power converter or the at least one high-pressure power converter includes an alternating current filter in the power distribution management unit housing that suppresses electromagnetic noise from the low-pressure electric machine or the high-pressure electric machine to the first power distribution management unit or the second power distribution management unit.

17. The gas turbine engine of claim 13, wherein the at least one low-pressure power converter or the at least one high-pressure power converter includes a power stage in the power distribution management unit housing that converts alternating current power from the low-pressure electric machine or the high-pressure electric machine to direct current.

18. The gas turbine engine of claim 13, wherein the first power distribution management unit or the second power distribution management unit includes a plurality of switches in the power distribution management unit housing for selectively opening or closing a plurality of channels from the low-pressure electric machine or the high-pressure electric machine to the at least one of the gas turbine engine or the one or more aircraft systems.

19. The gas turbine engine of claim 13, wherein the first power distribution management unit or the second power distribution management unit includes an electric power bus in the power distribution management unit housing that receives the electricity from the low-pressure electric machine or the high-pressure electric machine and supplies the electricity to the at least one of the gas turbine engine or the one or more aircraft systems.

20. The gas turbine engine of claim 13, wherein the first power distribution management unit or the second power distribution management unit includes a direct current filter in the power distribution management unit housing that suppresses electromagnetic noise from the at least one low-pressure power converter or the at least one high-pressure power converter to the at least one of the gas turbine engine or the one or more aircraft systems.

* * * * *